United States Patent
Zhang et al.

(10) Patent No.: US 8,320,275 B2
(45) Date of Patent: Nov. 27, 2012

(54) CHANNEL INFORMATION FEEDBACK METHOD, MOBILE STATION, BASE STATION, MULTI-INPUT MULTI-OUTPUT SYSTEM

(75) Inventors: Gong Zhang, Shenzhen (CN); Yi Long, Beijing (CN); Cheng He, Shenzhen (CN); Yong Cheng, Shenzhen (CN); Kaibin Huang, Shenzhen (CN); Jianneng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/274,101

(22) Filed: Oct. 14, 2011

(65) Prior Publication Data

US 2012/0033575 A1 Feb. 9, 2012

Related U.S. Application Data

(63) Continuation of application No. PCT/CN2010/070434, filed on Jan. 30, 2010.

(30) Foreign Application Priority Data

Apr. 17, 2009 (CN) .......................... 2009 1 0106694

(51) Int. Cl.
*H04L 12/26* (2006.01)
(52) U.S. Cl. ........ 370/252; 370/230; 370/335; 370/342; 370/441; 455/69; 455/561
(58) Field of Classification Search .................. None
See application file for complete search history.

(56) References Cited

U.S. PATENT DOCUMENTS

| 2004/0152491 A1 | 8/2004 | Lobinger et al. |
| 2008/0080449 A1* | 4/2008 | Huang et al. ................... 370/342 |
| 2008/0207135 A1* | 8/2008 | Varadarajan et al. ........... 455/69 |
| 2009/0180458 A1* | 7/2009 | Roberts ......................... 370/342 |

FOREIGN PATENT DOCUMENTS

| CN | 1946000 A | 4/2007 |
| CN | 101183890 A | 5/2008 |
| CN | 101340218 A | 1/2009 |
| CN | 101374003 A | 2/2009 |
| CN | 101399590 A | 4/2009 |

OTHER PUBLICATIONS

International Search Report dated May 6, 2010 in connection with International Patent Application No. PCT/CN2010/070434.
Written Opinion of the International Searching Authority dated May 6, 2010 in connection with International Patent Application No. PCT/CN2010/070434.
Xiaoming Chen, et al., "Codebook Design and Power Allocation for Distributed Space Time Codes", 2009 IEEE, p. 5 pages.

(Continued)

*Primary Examiner* — Ayaz Sheikh
*Assistant Examiner* — Nicholas Sloms

(57) ABSTRACT

A channel information feedback method, an information processing method, a mobile station, a base station, and a MIMO system are disclosed by embodiments of the present invention. Through the foregoing technical solutions, different numbers of channel information feedback bits are allocated for different channels dynamically, and the feedback gain is made better use of.

13 Claims, 14 Drawing Sheets

OTHER PUBLICATIONS

Supplementary European Search Report dated May 23, 2012 in connection with European Patent Application No. EP 10 76 4063.

"Further Considerations on MBSFN Precoding for DL CoMP", Sharp, 3GPP TSG RAN WG1 Meeting #56bis, Seoul, Korea, Mar. 23-27, 2009, 12 pages.

"Collaborative MIMO for LTE-Advanced Downlink", Alcatel Shanghai Bell, Alcatel-Lucent, 3GPP TSG RAN WG1 Meeting #54, Jeju, Korea, Aug. 18-22, 2008, 7 pages.

"Aspects of Coordinated Multi-point Transmission for Advanced E-UTRA", Texas Instruments, 3GPP TSG RAN WG1 #54bis, Prague, Czech Republkic, Sep. 29-Oct. 3, 2008, 5 pages.

* cited by examiner ized with US 8,320,275 B2

CHANNEL INFORMATION FEEDBACK METHOD, MOBILE STATION, BASE STATION, MULTI-INPUT MULTI-OUTPUT SYSTEM

CROSS-REFERENCE TO RELATED APPLICATIONS

This application is a continuation of International Application No. PCT/CN2010/070434, filed on Jan. 30, 2010, which claims priority to Chinese Patent Application No. 200910106694.6, filed on Apr. 17, 2009, both of which are hereby incorporated by reference in their entireties.

TECHNICAL FIELD

The present invention relates to communication technologies, and in particular, to a Channel Information feedback method, a Mobile Station, a Base Station and a Multi-Input Multi-Output system.

BACKGROUND

Coordinated MIMO (Co-MIMO) is a key physical-layer technology of the IMT-Advanced standard. In a cellular system that multiplexes frequency globally, inter-cell interference is a main factor of restricting mobile communication performance. The conception of Co-MIMO is to coordinate signal transmission between multiple Base Stations (BS) so as to relieve interference between cells. In a Co-MIMO system, multiple BSs coordinate to provide communication services for multiple Mobile Stations (MS) simultaneously.

Unlike the traditional Space Division Multiple Access (SDMA) precoding scheme with finite feedback of Channel State Information at the Transmitter (CSIT) of a single BS, the Co-MIMO system is inherently characterized by: Each channel from a coordinating BS to an MS has different quality. Consequently, the signal received by the MS from each of different BSs has a different average Signal-to-Noise Ratio (SNR). For the purpose of precoding design based on the channel state, the MS needs to feedback channel state information of the channel to the BS. In the prior art, the channel information feedback bits are allocated averagely regardless of the channel quality. As a result, the channel of high quality and the channel of low quality have the same number of channel information feedback bits.

In the prior art, the channel information feedback bits are allocated averagely, the amount of channel state information fed back is limited, and the feedback gain is low.

SUMMARY

The embodiments of the present invention provide a channel information feedback method, an MS, a BS, and a MIMO system. Different numbers of channel information feedback bits are allocated to different channels dynamically according to the channel state, and a channel state information codebook is generated according to the allocated number of feedback bits. In this way, the channel state information of the channel is reflected thoroughly, and the feedback gain is made full use of.

A channel state information feedback method provided in an embodiment of the present invention includes:

allocating the number of channel information feedback bits to each channel dynamically according to quality of the channel;

determining size of a channel state information codebook of each channel according to the number of channel information feedback bits dynamically allocated to each channel, and generating a channel state information codebook;

determining a feedback codeword in the channel state information codebook according to channel state information, where the feedback codeword is designed to feed back the channel state information; and sending a result of allocating the number of channel information feedback bits and sending an index number of the feedback codeword, where the index number is an identifier of the feedback codeword.

An information processing method provided in an embodiment of the present invention includes:

receiving a dynamic allocation result sent by an MS, where the dynamic allocation result is a result of the MS allocating the number of channel information feedback bits to each channel dynamically according to quality of the channel;

determining size of a channel state information codebook according to the allocation result, and generating a channel state information codebook;

receiving a feedback codeword index number sent by the MS, finding a corresponding feedback codeword in the channel state information codebook according to the feedback codeword index number, and obtaining channel state information fed back by the MS in the feedback codeword, where the index number is an identifier of the feedback codeword; and performing precoding design according to the channel state information.

An MS provided in an embodiment of the present invention includes:

a dynamic bit allocating module, configured to allocate the number of channel information feedback bits to each channel dynamically according to quality of the channel;

a first sending module, configured to send a result of allocating the number of channel information feedback bits;

a channel state information codebook generating module, configured to determine size of a channel state information codebook of each channel according to the number of channel information feedback bits allocated by the dynamic bit allocating module, and generate a channel state information codebook;

a feedback codeword determining module, configured to determine a feedback codeword in the channel state information codebook according to channel state information, where the feedback codeword is designed to feedback the channel state information; and a second sending module, configured to send a feedback codeword index number determined by the feedback codeword determining module, where the index number is an identifier of the feedback codeword.

A BS provided in an embodiment of the present invention includes:

a first receiving module, configured to receive a dynamic allocation result sent by an MS, where the dynamic allocation result is a result of the MS allocating the number of channel information feedback bits to each channel dynamically according to quality of the channel;

a channel state information codebook generating module, configured to determine size of a channel state information codebook according to the allocation result, and generate a channel state information codebook;

a second receiving module, configured to receive a feedback codeword index number sent by an MS, where the index number is an identifier of a feedback codeword;

a feedback codeword determining module, configured to find a corresponding feedback codeword in the channel state information codebook according to the feedback codeword index number received by the second receiving module, and obtain, in the feedback codeword, channel state information fed back by the MS; and a precoding design module, configured to perform precoding design according to the channel state information obtained by the feedback codeword determining module.

A Multi-Input Multi-Output (MIMO) communication system provided in an embodiment of the present invention includes at least two BSs and at least one MS;

The MS is configured to: allocate the number of channel information feedback bits to each channel dynamically according to quality of the channel; determine size of a channel state information codebook of each channel according to the number of channel information feedback bits allocated to each channel dynamically, and generate a channel state information codebook; determine a feedback codeword in the channel state information codebook according to channel state information; and send a result of allocating the number of channel information feedback bits and send an index number of the feedback codeword, where the feedback codeword is designed to feed back the channel state information obtained according to a channel estimation result, and the index number is an identifier of the feedback codeword; and The BS is configured to: receive from the MS the result of allocating the number of channel information feedback bits; determine, according to the allocation result, the size of the channel state information codebook of a channel leading to the MS, and generate a channel state information codebook; receive the feedback codeword index number sent by the MS, and find the feedback codeword according to the index number in the channel state information codebook; and perform precoding design according to the channel state information fed back by the feedback codeword.

Through the foregoing technical solutions, different number of channel information feedback bits is allocated to each channel dynamically according to the channel state, and a channel state information codebook of a different size is generated for each channel according to the allocated number of channel information feedback bits. In this way, the channel state information of the channel is reflected thoroughly, and the feedback gain is made full use of.

BRIEF DESCRIPTION OF THE DRAWINGS

To illustrate the technical solutions of the present invention or the prior art more clearly, the following outlines the accompanying drawings involved in description of the embodiments of the present invention or the prior art. Apparently, the accompanying drawings outlined below are illustrative rather than exhaustive. Persons of ordinary skill in the art can derive other drawings from them without any creative effort.

DETAILED DESCRIPTION

The following detailed description is given in conjunction with the accompanying drawings to provide a thorough understanding of the present invention. Evidently, the described embodiments of the present invention are part of rather than all of embodiments. All other embodiments, which can be derived by those skilled in the art from the described embodiments of the present invention without any creative effort, shall fall within the protection scope of the present invention.

Figure 1:
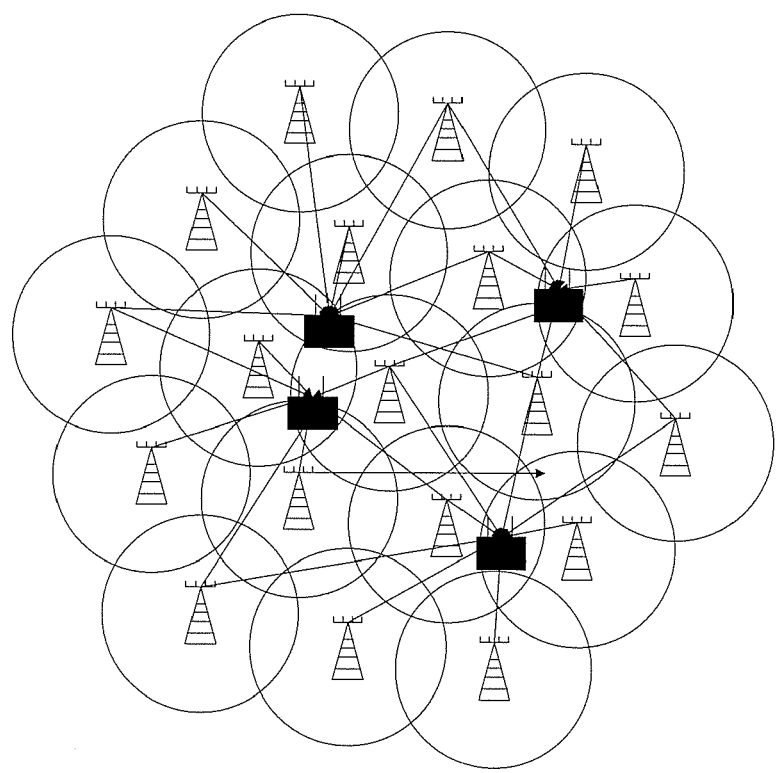
FIG. 1 is a schematic diagram of a Co-MIMO communication system model according to an embodiment of the present invention.

FIG. 1 is a schematic diagram of a Co-MIMO communication system model according to an embodiment of the present invention. As shown in FIG. 1, in a Co-MIMO system, multiple BSs coordinate to provide communication services for multiple MSs simultaneously. When finite bit feedback is applied, each MS needs to feedback multiple pieces of channel matrix information (each piece of channel matrix information includes channel state information of the channel). Therefore, the MS needs to allocate available feedback bits to each channel matrix properly so as to make full use of feedback bits.

Figure 2:
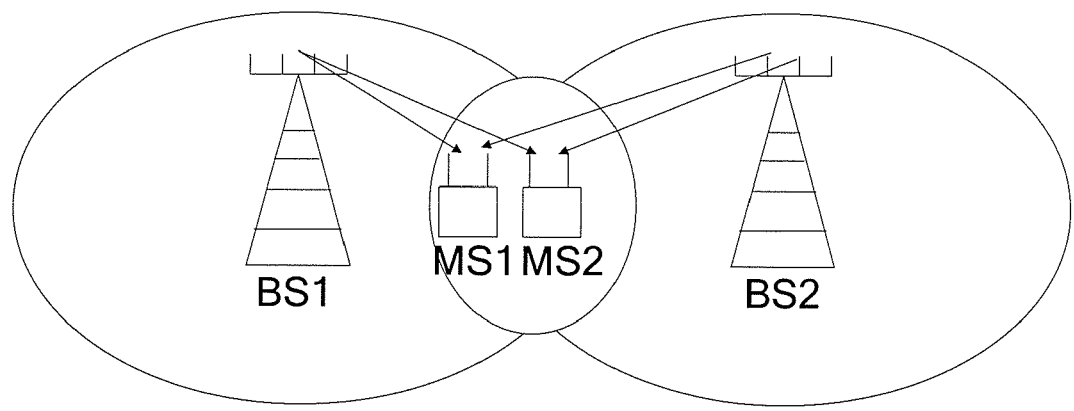
FIG. 2 is a schematic diagram of a Co-MIMO communication system according to an embodiment of the present invention.
Figure 7:
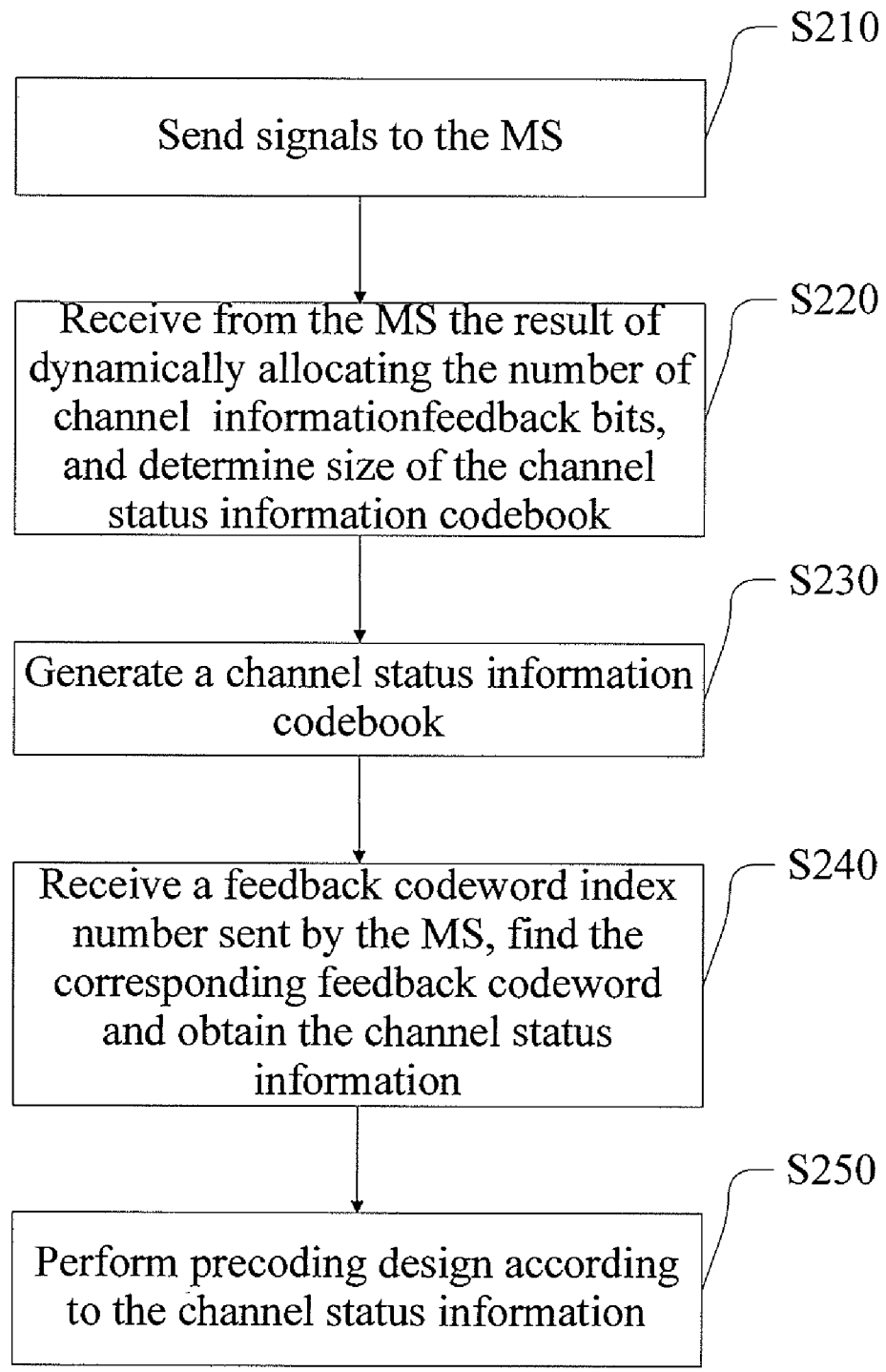
FIG. 7 is a schematic diagram of an information processing method according to an embodiment of the present invention.

For ease of understanding the Co-MIMO system intuitionally, FIG. 2 shows a communication scenario of a Co-MIMO communication system according to an embodiment of the present invention. As shown in FIG. 7, two neighboring BSs coordinate to serve two MSs. In this scenario, N=2 (number of BSs), K=2 (number of MSs), $n_T$=4 (number of transmitting antennas, and $n_R$=2 (number of receiving antennas). The two BSs have the same distance to MS2, but the distance from MS1 to BS1 is shorter than the distance from MS1 to BS2.

Figure 3:
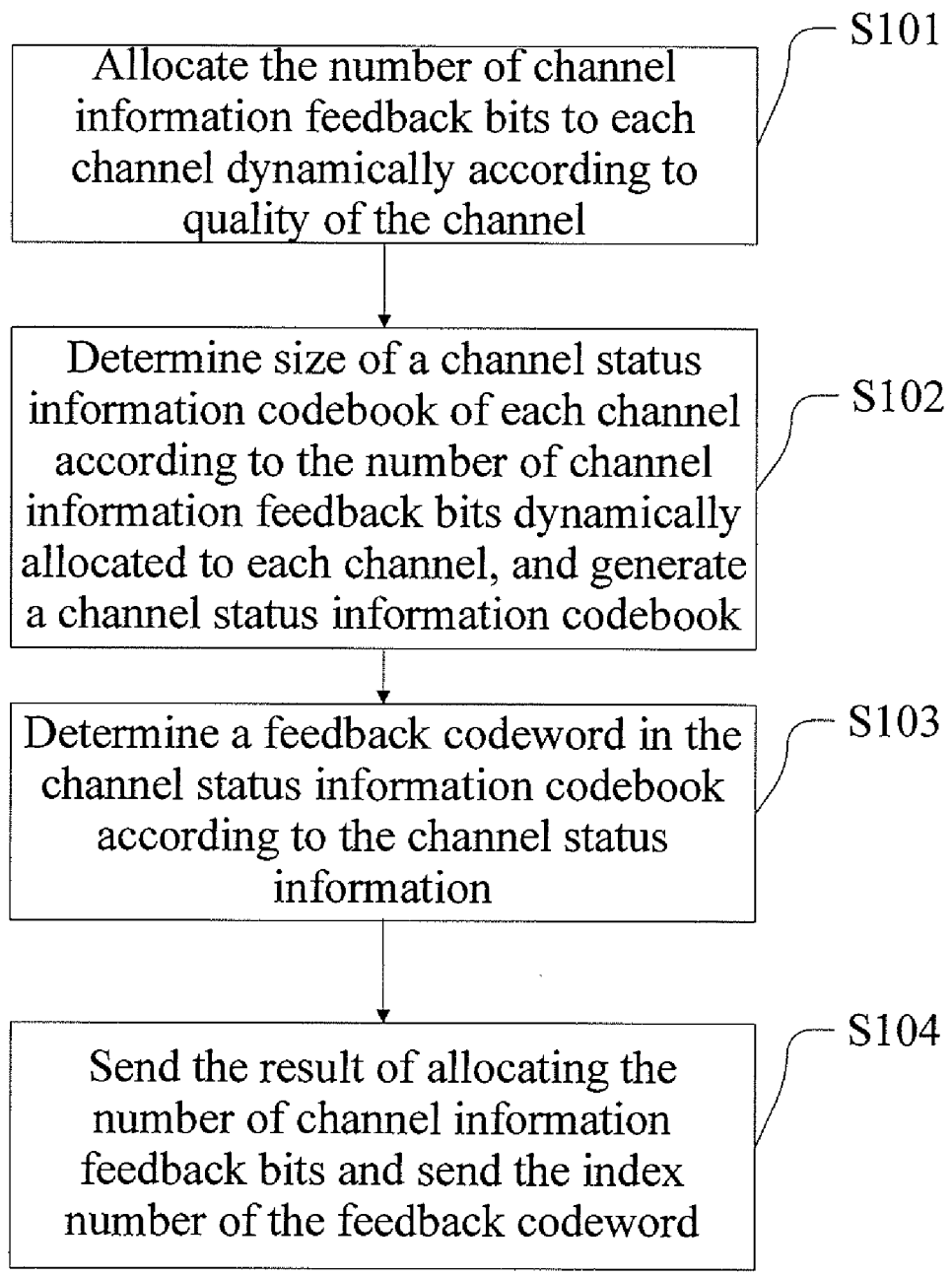
FIG. 3 is a schematic diagram of a channel information feedback method according to an embodiment of the present invention.

As shown in FIG. 3, a channel state information feedback method is provided in an embodiment of the present invention. The method is applied to the Co-MIMO system shown in FIG. 1 or FIG. 2, or applied to other communication system such as MIMO-OFDM system, Long Term Evolution (LTE) system, or WiMAX system. The method includes the following steps:

S101. Allocate the number of channel information feedback bits to each channel dynamically according to quality of the channel.

S102. Determine size of a channel state information codebook of each channel according to the number of channel information feedback bits allocated dynamically to each channel, and generate a channel state information codebook.

S103. Determine a feedback codeword in the channel state information codebook according to channel state information, where the feedback codeword is designed to feed back the channel state information.

S104. Send a result of allocating the number of channel information feedback bits and send an index number of the feedback codeword, where the index number is an identifier of the feedback codeword.

It should be noted that: After the BS receives the result of allocating the number of channel information feedback bits and the feedback codeword index number in step S104, the BS generates a channel state information codebook according to the allocated number of channel information feedback bits, where the channel state information codebook generated by the BS has the same size and content as the channel state information codebook on the MS; finds a feedback codeword in the generated channel state information codebook according to the received index number; and performs precoding design according to the channel state information fed back by the feedback codeword.

It should be noted that: The channel quality of each channel may be obtained through channel estimation or channel measurement.

Through the foregoing technical solutions, different number of channel information feedback bits is allocated to each channel dynamically according to the channel state, a channel state information codebook of a different size is generated for each channel according to the allocated number of channel information feedback bits, and precoding design is performed according to the channel state information fed back by the feedback codeword in the channel state information codebook. In this way, the feedback gain is made full use of.

Figure 4:
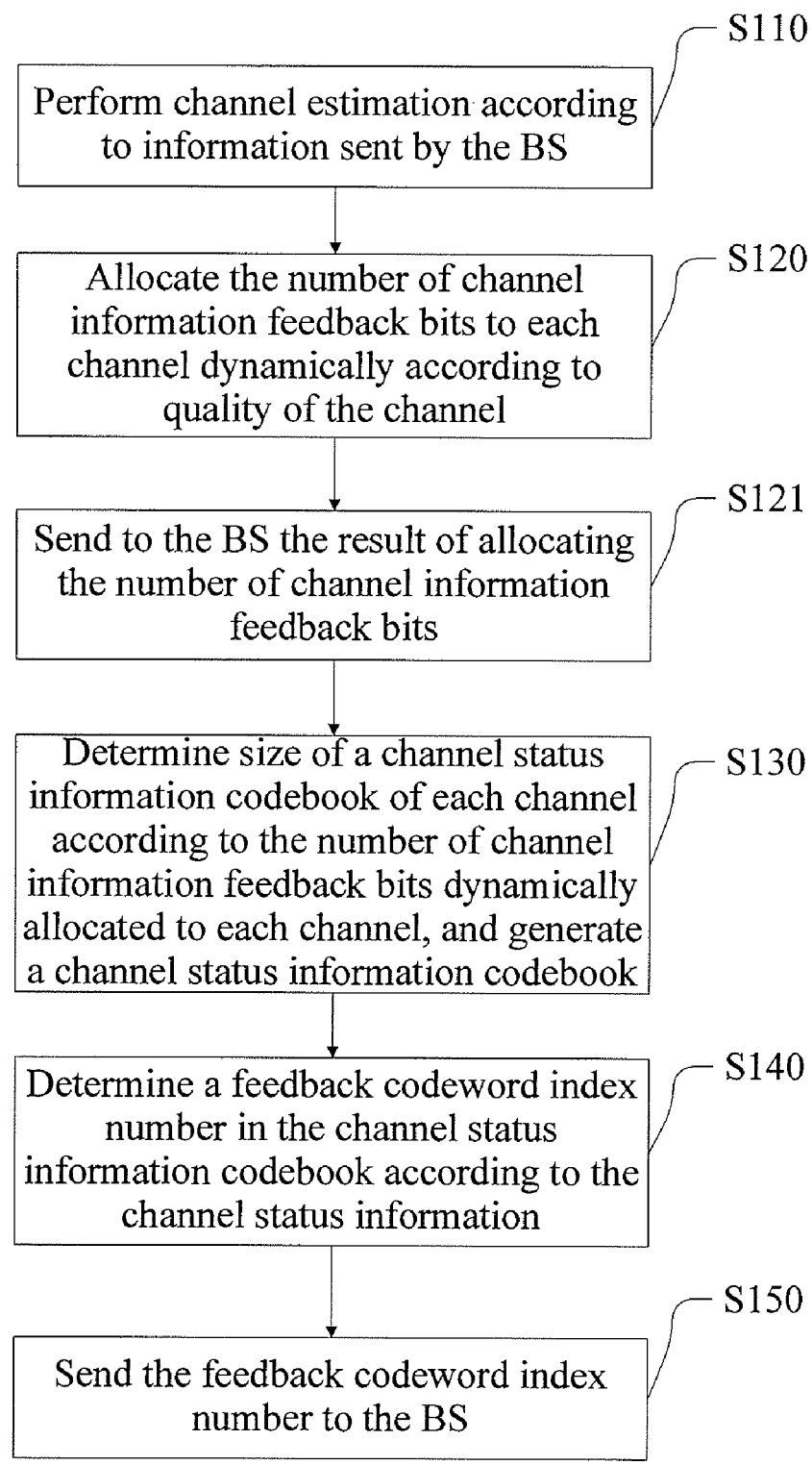
FIG. 4 is a schematic diagram of a channel information feedback method according to an embodiment of the present invention.

Specifically, as shown in FIG. 4, a channel information feedback method is provided in an embodiment of the present invention. The method is applied to the Co-MIMO system shown in FIG. 1 or FIG. 2, or applied to other communication system such as MIMO-OFDM system, LTE system, or WiMAX system. The method includes the following steps:

S110. Perform channel estimation according to information sent by the BS.

Channel estimation may be a process of estimating model parameters of a presumed channel model according to received data. Channel estimation may provide channel state information required by the receiver.

After receiving the information sent by the BS, the MS performs channel estimation according to the information sent by the BS. In an embodiment, the information sent by the BS may include a preset pilot signal. In this way, the MS can estimate a channel between the MS and the BS through a channel estimation algorithm according to the pilot signal preset in the information, so as to obtain channel model parameters, that is, obtain a channel matrix model. In an embodiment, the pilot signal is periodically inserted into the information sent by the BS. In another embodiment, the information to be sent is split into multiple data blocks beforehand, and multiple pilot signals are interpolated between the data blocks at intervals.

The channel estimation algorithm in an embodiment may be a least square channel estimation algorithm; the channel estimation algorithm in another embodiment may be a maximum likelihood estimation algorithm; and the channel estimation algorithm in another embodiment may be a Minimum Mean Square Error (MMSE) estimation algorithm or Maximum A posteriori Probability (MAP) estimation algorithm.

In another embodiment, a training sequence is added in the information to be sent beforehand, so as to take place of the pilot signal. In this way, after receiving the information sent by the BS, the MS can estimate the channel between the MS and the BS through a channel estimation algorithm according to the training sequence, so as to obtain channel model parameters, that is, obtain a channel matrix model. The training sequence in an embodiment may be signals of continuous blocks separated from the information sent by the BS; the training sequence in another embodiment may be inserted averagely in the information sent by the BS.

The channel estimation algorithm in an embodiment may be a least square channel estimation algorithm; the channel estimation algorithm in another embodiment may be a maximum likelihood estimation algorithm; and the channel estimation algorithm in another embodiment may be an MMSE estimation algorithm or a MAP estimation algorithm.

It can be understandable that in an embodiment, the channel estimation may be carried out through blind estimation. Blind estimation requires no training sequence or pilot signals, and uses the inherent information of the transmitted data to perform channel estimation. In another embodiment, the channel estimation based on pilot signals may be combined with the blind estimation to perform channel estimation, or the channel estimation based on the training sequence is combined with the blind estimation to perform channel estimation.

After the channel estimation, a channel matrix model between the MS and the BS is obtained, as detailed below:

Suppose that the channel estimation on the MS is perfect, for example, the MS has perfect channel state information and path loss information. Suppose that each BS has $n_T$ transmitting antennas, and each MS has $n_R$ receiving antennas. Through channel estimation, the channel from the transmitting antenna numbered n (transmitting antenna n) of the BS to the receiving antenna numbered m (receiving antenna m) of the MS is expressed as $H_{mn}$, and is modeled as:

$$H_{mn} = \sqrt{\frac{d_{mn}^{-\gamma}}{d_0}} H_{mn}^{w} \quad (1)$$

In the formula above, $d_{mn}$ is a distance from transmitting antenna n of the BS to receiving antenna m of the MS, $d_0$ is a preset standard distance, $\gamma$ is a path loss factor, $d_{mn}^{-\gamma}$ represents path fading, $H_{mn}^{w}$ represents small-scale Rayleigh fading, and $H_{mn}$ is an $n_R \times n_T$ dimensional matrix. Further, in another embodiment, the MS can obtain $d_{mn}^{-\gamma}$ and $H_{mn}^{w}$ parameters according to formula (1), so as to obtain the path fading data of the channel and the small-scale Rayleigh fading data, and obtain the channel state information such as SNR according to the fading data.

In a Co-MIMO communication system shown in FIG. 1, N BSs provide communication services for MS numbered m (namely, MS m) simultaneously, where N is time-variant. For the MS m, N channel matrices need to be estimated, namely, $H_{mn_1}, H_{mn_2}, \ldots, H_{mn_N}$ and all such matrices have a structure similar to formula (1). Therefore, a total channel matrix is:

$$H_m = [H_{mn_1} \ H_{mn_2} \ \ldots \ H_{mn_N}] \quad (2)$$

In formula (2), each element of the channel matrix is a submatrix, and is a channel matrix between each BS and MS m, and represents information about all channels between each BS and MS m, that is, includes information about channels from all antennas of the BS to all antennas of the MS. Therefore, in an embodiment, the MS performs channel estimation to obtain information such as path loss, receiving SNR, and Signal-to-Noise-And-Distortion (SINAD) ratio; and infers the channel quality according to the information such as path loss, receiving SNR or SINAD ratio or according to a combination of such information. In another embodiment, the channel quality may be obtained through measurement. For example, the information such as path loss, receiving SNR, and SINAD ratio is obtained through measurement, and then the channel quality is calculated or inferred according to a combination of such information.

S120. Allocate the number of channel information feedback bits to each channel dynamically according to quality of the channel.

In a cellular system with finite feedback, the total number of allocated bits is a preset finite number. In a Co-MIMO communication system, the quality of each channel is not completely the same. Through a preset policy of dynamically allocating bits, different numbers of channel information feedback bits are allocated to the channels of different quality, and feedback gain is made better use of.

Specifically, as against the averagely allocated number of channel information feedback bits, the number of channel information feedback bits allocated to a channel of higher quality is greater. Therefore, channel information feedback bits of the greater number bear more channel state information than the average number of channel information feedback bits. For the channels of low quality, the average number of channel information feedback bits is enough for bearing all channel state information. In this way, less channel information feedback bits may be allocated to the channels in a worse state, and more channel information feedback bits are allocated to the channels in a better state. In this way, the finite total number of channel information feedback bits can be made better use of, and the channel state information provided for the BS is as complete as possible. The BS adjusts the transmitting power according to the channel state information so that the receiver can receive better gain as against the averagely allocated number of channel information feedback bits.

In an embodiment, the channel quality is strongly related to the distance between the BS and the MS. Therefore, for an MS closer to the BS, the average SNR of the channel of the MS is higher, and the channel quality of the MS is higher. For example, in an embodiment, two BSs, that is, BS1 and BS2, coordinate to serve one MS. When the MS is closer to BS1 than BS2, the channel between BS1 and the MS has higher quality than the channel between BS2 and the MS.

In a cellular system with finite feedback, the total number of allocated bits is a preset finite number. Supposing that a total of 8 channel information feedback bits are used for feeding back channel state information, 5 channel information feedback bits may be allocated to the channel between BS1 and the MS, and 3 channel information feedback bits may be allocated to the channel between BS2 and the MS. In another embodiment, 6 channel information feedback bits may be allocated to the channel between BS1 and the MS, and 2 channel information feedback bits may be allocated to the channel between BS2 and the MS. In a cellular system with finite feedback, performance gain (SNR gain or capacity gain) is a function of the average SNR and the number of channel information feedback bits. Therefore, the MS allocates the number of channel information feedback bits to the channels dynamically according to the quality of each channel, which effectively enhances the system performance.

In an embodiment, the channel quality is reflected by the information such as path loss, receiving SNR, or SINAD ratio obtained through channel estimation (as illustrated in S110) or measurement on the MS.

Further, to quantize the channel quality more accurately, in another embodiment, different levels of the channel quality may be reflected by different SINRs (Signal to Interference and Noise Ratio, SINR). Therefore, according to the SINR, through a preset policy of allocating bits dynamically, different numbers of channel information feedback bits are allocated to the channels of different SINR. The SINR may be inferred according to the information such as path loss, receiving SNR, or SINAD ratio, or according to a combination of such information, where the information is obtained through channel estimation or measurement on the MS. In the following embodiments of the present invention, SINR is used to quantize the channel quality.

For better understanding of the dynamic bit allocation scheme, in another embodiment, the Co-MIMO system shown in FIG. 2 is taken as an example to expound the dynamic bit allocation scheme:

For ease of description, the path between MS1 and BS1 is expressed as BS1-MS1, the path between MS1 and BS2 is expressed as BS2-MS1, path between MS2 and BS1 is expressed as BS1-MS2, and the path between MS2 and BS2 is expressed as BS2-MS2.

The policy of allocating feedback bits dynamically is a threshold-based feedback bit allocation policy. In an embodiment, the threshold is a SINR difference between the MS and each of different coordinating BSs. In a Co-MIMO communication scenario shown in FIG. 2 according to an embodiment of the present invention, supposing that a total of 8 channel information feedback bits are used for feeding back channel state information, probable combinations of the channel information feedback bits are: (1, 7), (2, 6), (3, 5), and (4, 4). As shown in Table 1, according to the possible combinations, the following thresholds of SINR difference are set offline:

TABLE 1

| Threshold of SINR difference between MS and different BSs | Scheme of allocating channel information feedback bits |
|---|---|
| 0 dB | (4, 4) |
| 5 dB | (3, 5) |
| 10 dB | (2, 6) |
| 15 dB | (1, 7) |

For MS1, because its distance to BS1 and shorter than its distance to BS2, the SINR of BS1-MS1 is less than the SINR of BS2-MS1. Therefore, we assume that the SINR difference of the path is:

$$5 \text{ dB} \leq \text{SINR}_{BS1\text{-}MS1} - \text{SINR}_{BS2\text{-}MS1} \leq 10 \text{ dB}.$$

The foregoing inequality means that the SINR of MS1-BS1 minus the SINR of MS1-BS2 is greater than 5 dB but less than 10 dB, and may be 8 dB, for example. In this case, according to Table 1, 5 channel information feedback bits are allocated to the MS1-BS1 path to feedback channel state information, and 3 channel information feedback bits are allocated to the MS1-BS2 path to feedback channel state information. It is understandable that if the SINR difference between the two paths is 12 dB or 11 dB, then according to Table 1, 6 channel information feedback bits are allocated to the MS1-BS1 path to feedback channel state information, and 2 channel information feedback bits are allocated to the MS1-BS2 path to feedback channel state information.

For MS2, because its distance to BS1 is the same as its distance to BS2, according to Table 1, 4 channel information feedback bits are allocated to the MS2-BS1 path to feedback channel state information, and 4 channel information feedback bits are allocated to the MS2-BS2 path to feedback channel state information. It is understandable that in another embodiment, the distance between MS2 and BS1 is different from the distance between MS2 and BS2. In this case, the allocation policy is similar to the allocation policy of MS1 shown in FIG. 2, and is not repeated herein.

It should be noted that the foregoing threshold is set offline (namely, preset), and the relevant information is stored in the BS and the MS. In this embodiment, the threshold values are shown in Table 1. In another embodiment, the preset threshold values may be different, for example, 0 dB, 4 dB, 8 dB, and 12 dB, or other preset values.

It should be noted that in another embodiment, the total number of channel information feedback bits is 10, 9, or another value. In this case, the feedback bit combinations similar to the examples given in Table 1 exist. For example, when the total number of channel information feedback bits is 10, probable combinations of feedback bits are (1, 9), (2, 8), (3, 7), (4, 6), and (5, 5), and the corresponding SINR difference threshold may be set to be 12 dB, 9 dB, 6 dB, 3 dB, and 0 dB; in another embodiment, the threshold may be set to be other values. When the total number of channel information feedback bits is another value, the settings are similar.

It can be understandable that in another embodiment, the policy of allocating feedback bits dynamically may be set according to comparison between a ratio of SINRs of paths between the MS and different BSs and a preset threshold. As shown in Table 2, according to probable combinations, the following thresholds of SINR ratio are set offline:

As shown in FIG. 2, suppose that the SINR of BS1-MS1 is 10 dB, the SINR of BS2-MS1 is 16 dB, and the SINR ratio is 5:8=1:1.6. Because $1.5 \leq 1.6 \leq 2$, according to Table 2, 5 channel information feedback bits are allocated to the MS1-BS1 path to feedback channel state information, and 3 channel information feedback bits are allocated to the MS1-BS2 path to feedback channel state information.

TABLE 2

| Threshold of SINR ratio between MS and different BSs | Scheme of allocating channel information feedback bits |
|---|---|
| 1 | (4, 4) |
| 1.5 | (3, 5) |
| 2 | (2, 6) |
| 2.5 | (1, 7) |

It can be understandable that the threshold values in this embodiment are shown in Table 2. In another embodiment, the preset threshold values may be different, for example, 1 dB, 1.4 dB, 2 dB, 2.4 dB; or 1 dB, 2 dB, 2.5 dB, 3 dB; or 1 dB, 1.3 dB, 1.8 dB, and 2.2 dB. When the total number of channel information feedback bits is another value such as 10, the feedback bit combinations are (5, 5), (4, 6), (3, 7), (2, 8), and (1, 9), and the corresponding SINR ratio threshold values may be set to be 1 dB, 1.5 dB, 2 dB, 2.5 dB, and 3 dB; in another embodiment, the threshold values may be other values. When the total number of channel information feedback bits is another value, the settings are similar.

It is understandable that when there are 3 or more coordinating BSs, the SINR of the path from the MS to each of different coordinating BSs differs, and the SINR ratio differs. For example, when 3 BSs exist, supposing that the SINR ratio of the paths between the MS and three BSs is 1:1:2, if there are 8 channel information feedback bits in total, 2, 2 and 4 channel information feedback bits may be allocated to corresponding paths respectively; if the SINR ratio is another value or the total number of channel information feedback bits is another value, the dynamic allocation policy is similar, and can be set flexibly as required. If there are 3 or more coordinating BSs, the threshold values may be set according to probable combinations of channel information feedback bits and according to a SINR difference between every two of the paths or the ratio of the SINR difference.

S121. Send the result of allocating the number of channel information feedback bits to the BS. In this way, after receiving the allocation result, the BS acquires the number of channel information feedback bits allocated to the path between the BS and the MS, and generates a channel state information codebook according to the allocated number of channel information feedback bits, where the channel state information codebook has the same size and content as the channel state information codebook on the MS. It should be noted that in an embodiment, the result of allocating channel information feedback bits may be sent to the BS directly; in another embodiment, the result of allocating channel information feedback bits may be sent to a forwarding apparatus, and the forwarding apparatus forwards the result to the BS.

S130. Determine size of a channel state information codebook of each channel according to the number of channel information feedback bits allocated to each channel dynamically, and generate a channel state information codebook.

The size of the channel state information codebook (C) of each channel between each BS and the MS is related to the number of channel information feedback bits allocated to the channel between each BS and the MS. For example, according to the result of channel estimation in S110, k channel information feedback bits are allocated to a channel, and therefore, the size of the channel state information codebook of the channel is $2^k$. In this embodiment, different numbers of channel information feedback bits are allocated to the channels with different SINR values (which represent the channel quality), and therefore, the channel state information codebooks of different sizes are applied to the channels with different SINR values. In this way, the channel with a higher average SNR uses a larger codebook that includes more codeword information.

After the size of the channel state information codebook is determined, the channel matrix estimated in the step S110 is decomposed. In an embodiment, the channel matrix estimated in step S110 may be decomposed in step S110; it is understandable that in another embodiment, the channel matrix may be decomposed before the step of determining the size of the codebook, and when to decompose the channel matrix is not limited specifically. Here is an example:

At MS numbered m, Singular Value Decomposition (SVD) is performed for the channel matrix $H_{mn}$ of each channel to obtain:

$$H_{mn} = U_{mn} S_{mn} V_{mn}^H \qquad (3)$$

After the SVD, $H_m$ (coordinated channel matrix between MS m and all coordinating BSs) may be expressed as:

$$H_m = [U_{mn_1} S_{mn_1} V_{mn_1}^H \ U_{mn_2} S_{mn_2} V_{mn_2}^H \ldots U_{mn_N} S_{mn_N} V_{mn_N}^H] \qquad (4)$$

Further, $H_m$ is simplified as:

$$H_m = A_m B_m \quad (5)$$

In the formula above, $$A_m = [U_{mn_1} S_{mn_1} \; U_{mn_2} S_{mn_2} \ldots U_{mn_N} S_{mn_N}] \quad (6)$$

$$B_m = \text{diag}([V_{mn_1} \; V_{mn_2} \ldots V_{mn_N}]^H) \quad (7)$$

In formula (7), each $V_{mn}$ is a channel direction information matrix of a channel between the MS and each of the N BSs; each $V_{mn}$ includes channel direction information of each channel, namely, includes the channel state information of all channels between each BS and the MS, or, includes the channel state information of channels between all antennas of the BS and all antennas of the MS.

The MS needs to feed back the $V_{mn}$ of each channel to the BS. However, as limited by the allocated number of channel information feedback bits, the $V_{mn}$ cannot be completely fed back to the BS directly. For example, if it takes 10 bits to feed back the $V_{mn}$ of a channel, the allocated bits are not enough to feed back the $V_{mn}$ if 5 channel information feedback bits are allocated to the channel. In the embodiment of the present invention, the channel state information codebook (C) is used to feed back the $V_{mn}$ appropriately, and 5 channel information feedback bits are allocated. Therefore, the channel state information codebook includes $2^5$ (namely, 32) codewords in total. Compared with the solution that does not use the codebook or applies the codebook of the same size to all channels, the solution in this embodiment generates codebooks of different sizes dynamically according to the allocated number of channel information feedback bits and uses the codeword in the codebook to feed back the $V_{mn}$ of the channel, which makes better use of the allocated channel information feedback bits to feed back the channel state information of the channel.

All codewords in the codebook C are compared with $V_{mn}$ to obtain a best codeword, and the best codeword is used as a feedback codeword. The index number of the feedback codeword is fed back to the BS. For example, if the $16^{th}$ codeword is the best, the index number "16" is fed back to the BS, and the BS finds the codeword corresponding to the index number "16" and obtains relatively the most approximate message of $V_{mn}$.

In this embodiment, a Grassmannian codebook is generated through a Lloyd algorithm, and is used as a channel state information codebook. It is understandable that in another embodiment, the channel state information codebook may be generated through a Generalized Lloyd Algorithm (GLA).

S140. Determine a feedback codeword in the generated channel state information codebook according to the channel state information estimated through channel estimation.

In formula (7), each $V_{mn}$ is a channel direction information matrix of a channel between the MS and each of the N BSs; each $V_{mn}$ includes channel direction information of each channel, namely, includes the channel state information of all channels between each BS and the MS, or, includes the channel state information of channels between all antennas of the BS and all antennas of the MS. Therefore, in an embodiment, the feedback codeword is determined according to the $V_{mn}$ of each channel. In another embodiment, the channel state information may be obtained in other modes, for example, the channel state information may be obtained through estimation or measurement of the signal power.

After the channel state information codebook is generated in step S130, a best codeword needs to be found as a feedback codeword for the channel direction information matrix $V_{mn}$ in order to feed back the channel direction information included in the $V_{mn}$ in the codebook C of a $2^k$ size (k is the allocated number of feedback bits). In this way, the feedback codeword reflects the channel state information included in the $V_{mn}$ as complete as possible. Supposing that the index number of the feedback codeword is c, the MS needs to find the feedback codeword through the following exhaustive search and comparison:

$$c = \arg\left\{\min_{V_c \in C} \{d_c(V_c, V_{mn})\}\right\} \quad (8)$$

In the formula above, $V_c$ is a codeword numbered c (codeword c) in the codebook C; $d_c(V_c, V_{mn})$ is a chordal distance between $V_{mn}$ and $V_c$, and is defined as:

$$d_c(V_c, V_{mn}) = \frac{1}{\sqrt{2}} \|V_{mn} V_{mn}^H - V_c V_c^H\|_F \quad (9)$$

In formula (9) above, the subscript F represents a norm. A norm is a measure of a function, vector, or matrix. A norm is used to measure the distance between two functions, vectors or matrices. A vector norm is a measure of length of a vector. The norm here represents distance between matrices, namely, chordal distance between $V_{mn}$ and $V_c$. In other words, according to formulae (8) and (9), the codeword $V_c$ with a minimum chordal distance to the $V_{mn}$ can be searched out exhaustively, and the codeword is used as a feedback codeword.

S150. After the MS determines the feedback codeword, the method further comprises the step S150. The MS may send the index number c of the feedback codeword $V_c$ to the BS through an uplink feedback channel. The index number c is an identifier of the feedback codeword $V_c$. In all embodiments of the present invention, an index number serves as an identifier of a feedback codeword.

It should be noted that in an embodiment, the index number c of the feedback codeword $V_c$ may be sent to the BS directly; in another embodiment, the index number c of the feedback codeword $V_c$ may be sent to a forwarding apparatus, and the forwarding apparatus forwards the index number to the BS.

It should be noted that after the channel information feedback bits are allocated in S121, the allocation result is fed back to the BS. After receiving the allocation result, the BS acquires the number of channel information feedback bits allocated to the channel between the BS and the MS, and generates a channel state information codebook according to the allocated number of channel information feedback bits, where the channel state information codebook has the same size and content as the channel state information codebook on the MS.

Because the BS and the MS agree on the codebook, the BS can find in the codebook a best codeword $V_c$ according to the received index number c, obtain the channel state information of the downlink channel according to $V_c$, and perform the corresponding precoding design according to the obtained channel state information.

Figure 5:
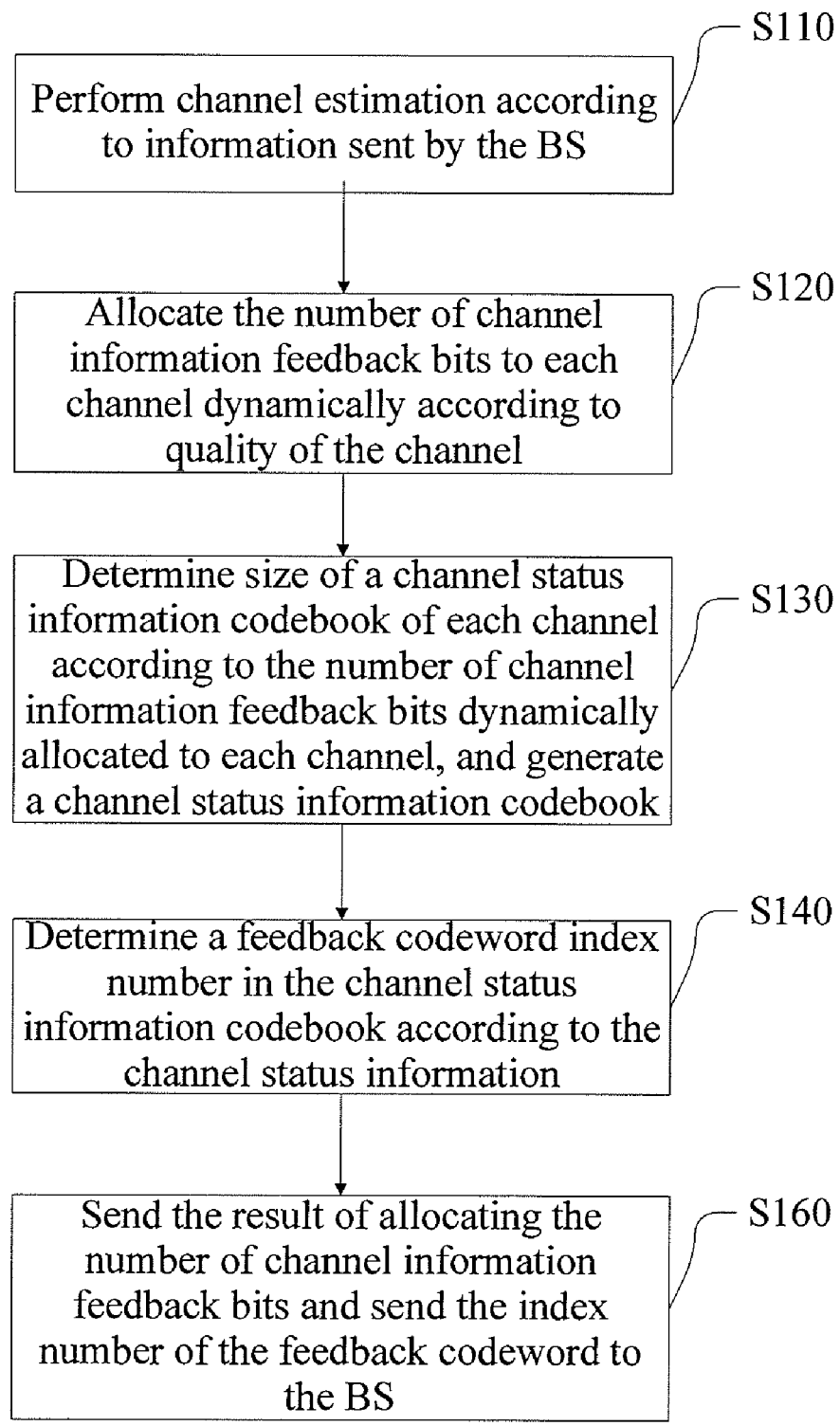
FIG. 5 is a schematic diagram of a channel information feedback method according to an embodiment of the present invention.

It should be noted that, as shown in FIG. 5, in another embodiment, the sending of the result of allocating channel information feedback bits to the BS in step S121 may occur after step S140. That is, in step S160 in the embodiment shown in FIG. 4, the result of allocating channel information feedback bits and the index number of the feedback codeword are sent to the BS. The result of allocating channel information feedback bits and the index number of the feedback codeword may be sent to the BS together in an embodiment, or may be sent to the BS separately in another embodiment. Moreover, it can be understandable that the result of allocating channel information feedback bits may be sent to the BS before or after the index number of the feedback codeword is sent to the BS, and the sequence is not limited specifically.

Through the foregoing technical solutions according to the embodiments of the present invention, the number of channel information feedback bits is allocated to each channel dynamically according to the channel estimation result, the size of a channel state information codebook of each channel is determined according to the allocated number of channel information feedback bits, a same codebook is generated on the BS and on the MS simultaneously for the same channel, and a codeword for feeding back channel state information is determined in the codebook. For a given total number of channel information feedback bits, the MS dynamically allocates the channel information feedback bits to different channels more reasonably, and makes better use of the feedback gain. In embodiments of the present invention, more BSs may participate in Co-MIMO communication, and the channel information feedback bits are allocated and the channel state information codebook is processed for each coordinating BS instead of regarding all coordinating BSs as a "super BS". Based on the state of the channel between each coordinating BS and the MS, the processing is flexible, and the processing flexibility is improved.

Figure 6:
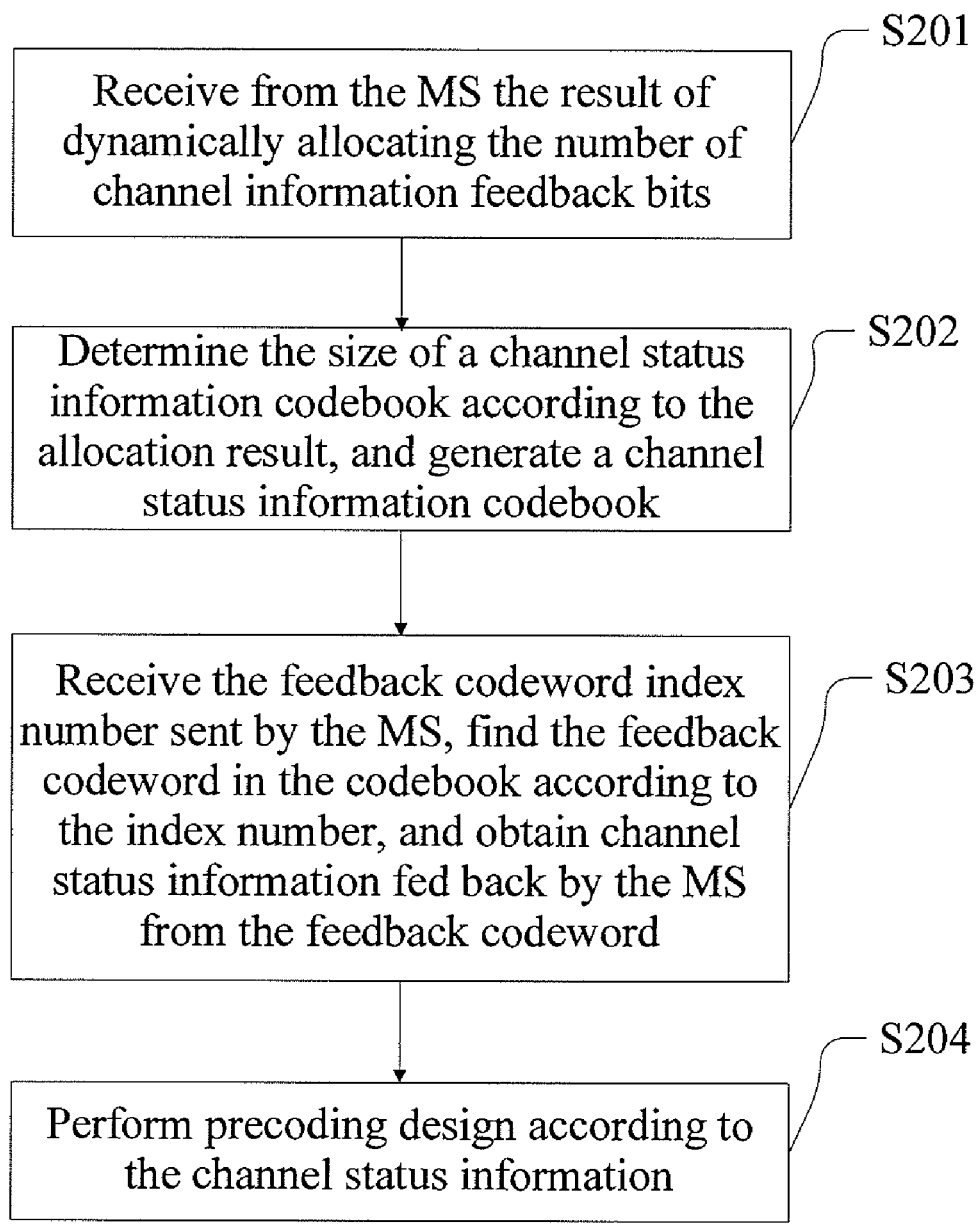
FIG. 6 is a schematic diagram of an information processing method according to an embodiment of the present invention.

As shown in FIG. 6, an information processing method is provided in an embodiment of the present invention. This method is applied to the Co-MIMO system shown in FIG. 1 or FIG. 2, or applied to another communication system such as MIMO-OFDM system, LTE system, or WiMAX system. The method includes the following steps:

S201. Receive a dynamic allocation result that is of the number of channel information feedback bits and is sent by an MS, where the dynamic allocation result is a result of the MS allocating the number of channel information feedback bits to each channel dynamically according to quality of the channel.

S202. Determine the size of a channel state information codebook according to the allocation result, and generate a channel state information codebook.

S203. Receive a feedback codeword index number sent by the MS, find, according to the feedback codeword index number, a corresponding feedback codeword in the channel state information codebook generated in S202, and obtain, in the feedback codeword, channel state information fed back by the MS, where the index number is an identifier of the feedback codeword.

S204. Perform precoding design according to the channel state information.

It should be noted that the channel quality of each channel may be obtained through channel estimation or channel measurement on the MS side.

Through the foregoing technical solutions, different number of channel information feedback bits is allocated to each channel dynamically according to the channel state, a channel state information codebook of a different size is generated for each channel according to the allocated number of channel information feedback bits, and precoding design is performed according to the channel state information fed back by the feedback codeword in the channel state information codebook. In this way, the feedback gain is made full use of.

Figure 17:
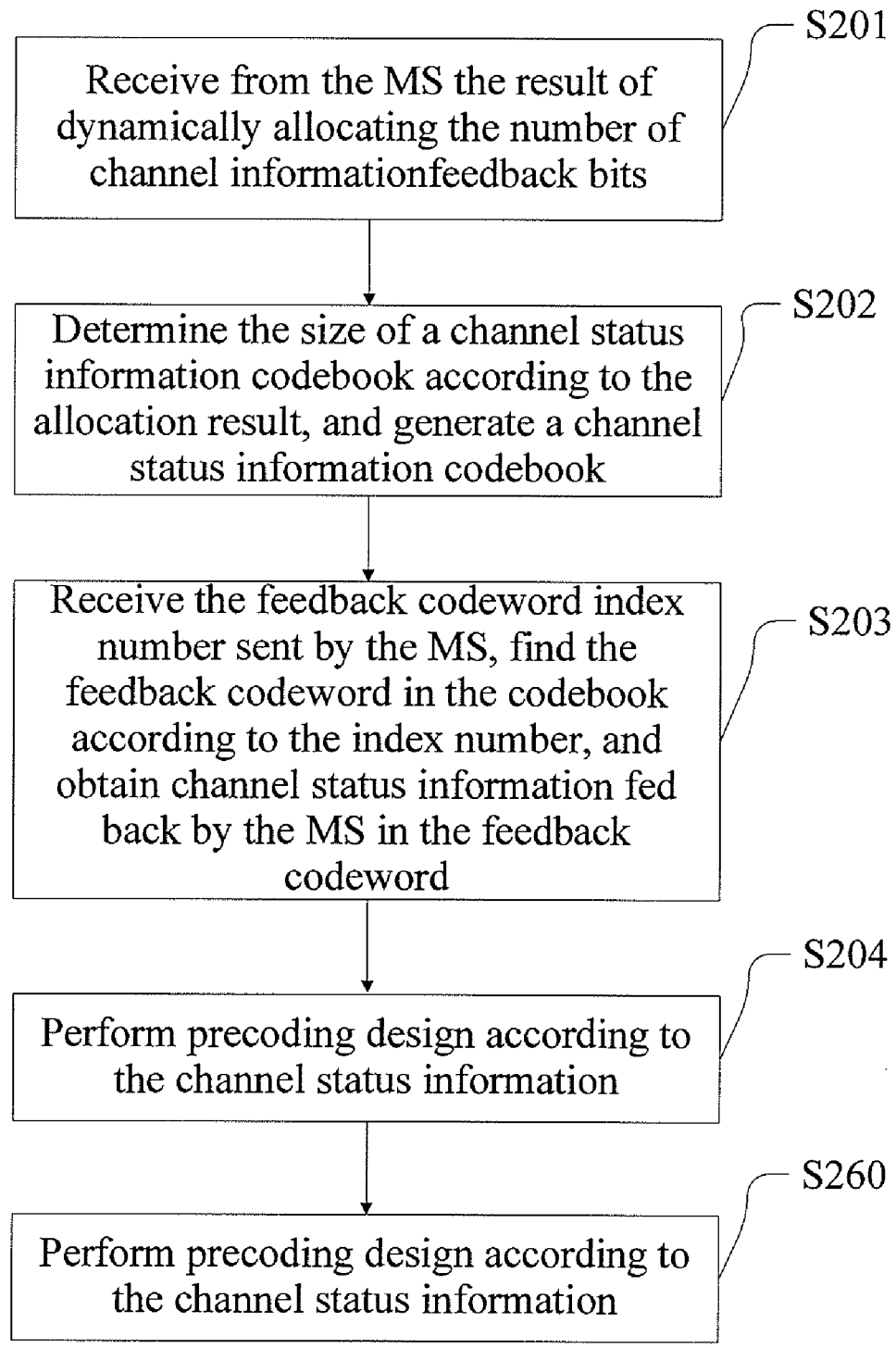
FIG. 17 is a schematic diagram of an information processing method according to an embodiment of the present invention.

As shown in FIG. 17, in another embodiment, after the BS performs precoding design, the method may further include:

S260. Set a different power allocation factor for each MS according to a preset query table, and allocate power to each MS.

By allocating the number of channel information feedback bits dynamically in the embodiment shown in FIG. 6, the performance of the MSs in the cell (especially the MSs at the center of the cell) is improved significantly. Through the power allocation policy provided in the embodiment, a part of the performance enhanced for the MSs at the center of the cell is transferred to the MSs at the edge of the cell, and therefore, the communication performance of the MSs at the edge of the cell is improved without impairing the performance of the MSs at the center of the cell.

Specifically, as shown in FIG. 7, an information processing method is provided in an embodiment of the present invention. This method is applied to the Co-MIMO system shown in FIG. 1 or FIG. 2, or applied to another communication system such as MIMO-OFDM system, LTE system, or WiMAX system. The method includes the following steps:

S210. Send information to an MS, where the information carries channel estimation information which is used for the MS to perform channel estimation.

In an embodiment, the channel estimation information in the information sent by the BS may be a preset pilot signal, where the channel estimation information is used for the MS to perform channel estimation. In this way, the MS can estimate the channel between the MS and the BS through a channel estimation algorithm according to the pilot signal preset in the information, so as to obtain channel model parameters, namely, obtain a channel matrix model. In an embodiment, the pilot signal is inserted periodically into the information sent by the BS. In another embodiment, the information to be sent is split into multiple data blocks beforehand, and multiple pilot signals are interpolated between the data blocks at intervals.

In another embodiment, a training sequence is added in the information to be sent beforehand to take place of the pilot signal. In this way, after receiving the information sent by the BS, the MS can estimate the channel between the MS and the BS through a channel estimation algorithm according to the training sequence so as to obtain channel model parameters, namely, obtain a channel matrix model. The training sequence in an embodiment may be signals of continuous blocks separated from the information sent by the BS; the training sequence in another embodiment may be inserted averagely in the information sent by the BS.

The MS performs channel estimation according to the information sent by the BS, and allocates the number of channel information feedback bits to the channel between the MS and each of different BSs dynamically according to the result of channel estimation. That is, the MS allocates different numbers of channel information feedback bits to the channels of different average SNR values dynamically, and feeds back the allocation result to the BS.

S220-S230. Receive a dynamic allocation result that is of the number of channel information feedback bits and is sent from the MS; determine the size of a channel state information codebook according to the allocation result, and generate a channel state information codebook, where the allocation result is a result of the MS allocating the number of channel information feedback bits to each channel dynamically according to quality of the channel.

It should be noted that the MS may determine the channel quality according to the channel estimation result in step S210 in an embodiment or may obtain the channel quality through measurement in another embodiment, which has been detailed in the embodiments shown in FIG. 3-FIG. 5, and is not repeated herein any further.

After receiving the result that is of allocating the number of channel information feedback bits and is sent by the MS, each coordinating BS acquires from the allocation result the number of channel information feedback bits that are allocated by the MS to the channel between the MS and the BS.

The size of the channel state information codebook of a channel between each coordinating BS and the MS is related to the number of channel information feedback bits allocated by the MS to this channel. For example, if the MS allocates k channel information feedback bits to a channel, the size of the channel state information codebook of the channel is $2^k$. In this embodiment, different numbers of channel information feedback bits are allocated to the channels with different average SNR values dynamically, and therefore, the channel state information codebooks of different sizes are applied to the channels with different average SNR values. In this way, the channel with a higher average SNR uses a larger codebook that includes more codeword information. Therefore, the channel information can be reflected more comprehensively and accurately.

After the size of the channel state information codebook is determined, the BS in this embodiment can generate a Grassmannian codebook through a Lloyd algorithm, and use this codebook as a channel state information codebook. In another embodiment, the channel state information codebook may be generated through a GLA. In this case, a codebook may be generated on the MS side according to the number of allocated channel information feedback bits, where the codebook has the same size and content as the codebook on the BS side, which has been detailed in the embodiments shown in FIG. 3-FIG. 5, and is not repeated here any further.

S240. Receive the feedback codeword index number sent by the MS, find the corresponding feedback codeword in the codebook generated in S230, and obtain channel state information fed back by the feedback codeword.

The feedback codeword index number sent by the MS is a feedback codeword index number determined, according to the channel state information obtained through channel estimation, by the MS in the channel state information codebook generated on the MS side.

The process of generating the channel state information codebook on the MS side and the process of determining the feedback codeword have been detailed in the embodiments shown in FIG. 3-FIG. 5, and are not repeated here any further.

Because the BS and the MS agree on the codebook, the BS can find, according to the received index number, a best codeword (namely, feedback codeword) determined by the MS in the channel state information codebook. The BS obtains the channel state information of the downlink channel to the MS according to the feedback codeword.

S250. Perform precoding design according to the channel state information obtained according to the feedback codeword.

After collecting all channel state information fed back by the MS, the BS performs precoding design. That is, after the MS feeds back channel state information of channels between the MS and all coordinating BSs to the BS, the BS starts to perform precoding design.

In this embodiment, the precoding design is performed on the basis of a zero-forcing linear precoding algorithm, for example.

In the zero-forcing linear precoding algorithm, the precoding of the MS is found in a joint zero space of all other user channel matrices. To calculate the precoding of the MS numbered m, it is necessary to find the orthogonal basis of the zero space of $H_{-m}$. The $H_{-m}$ is an approximate value of a channel coordination matrix $H_m = [U_{mn_1} S_{mn_1} V_{mn_1}^H U_{mn_2} S_{mn_2} V_{mn_2}^H \ldots U_{mn_N} S_{mn_N} V_{mn_N}^H]$ obtained by the BS according to the channel state information received from the MS.

As mentioned in the preceding embodiments (shown in FIG. 3-FIG. 5), the MS needs to feed back the $V_{mn}$ of each channel to the BS, but the $V_{mn}$ cannot be completely fed back to the BS directly due to the limitation of the allocated number of channel information feedback bits. The MS compares all codewords in the channel state information codebook C with $V_{mn}$ to select a best codeword as a feedback codeword, and sends the index number of the feedback codeword to the BS. The BS finds the feedback codeword in the channel state information codebook on the BS side according to the index number, and obtains an approximate value of $V_{mn}$ according to the channel state information fed back by the feedback codeword.

After collecting all $V_{mn}$ information fed back by the MS, the BS obtains the approximate value $B_{-m}$ of $B_m$:

$$B_{-m} = [B_1^H B_2^H \ldots B_{m-1}^H B_{m+1}^H \ldots B_K^H]^H \qquad (10)$$

As described in formula (5) in the preceding embodiments (shown in FIG. 3-FIG. 5), the zero space of $B_m$ is located in the zero space of $H_m$. Therefore, the zero space of $B_{-m}$ may be calculated in place of calculating the zero space of $H_{-m}$. Through the calculation of $B_{-m}$, the orthogonal basis of the zero space of $B_{-m}$ is obtained. According to the orthogonal basis calculated out, the precoding design is performed through a zero-forcing linear precoding algorithm. It can be understandable that in another embodiment, a block-orthogonality zero-forcing linear precoding algorithm or a matched filter precoding algorithm may be applied.

In another embodiment, a nonlinear precoding algorithm such as dirty paper coding algorithm, nonlinear sending zero-forcing precoding algorithm, or Tomlinson-Harashima Precoding (THP) precoding algorithm may be applied, which involve much complexity of implementation though.

Through the foregoing technical solutions, the number of channel information feedback bits is allocated to each channel dynamically according to the channel estimation result, the size of a channel state information codebook of each channel is determined according to the allocated number of channel information feedback bits, a codebook of a same size is generated on the BS and on the MS for the same channel, and a codeword for feeding back channel state information is determined in the codebook. For a given total number of channel information feedback bits, the MS allocates the number of channel information feedback bits to different channels more reasonably, and makes better use of the feedback gain. In an embodiment of the present invention, more BSs may participate in Co-MIMO communication, and the channel information feedback bits are allocated and the channel state information codebook is processed for each coordinating BS instead of regarding all coordinating BSs as a "super BS". Based on the state of the channel between each coordinating BS and the MS, the processing is flexible, and the processing flexibility is improved.

Figure 8:
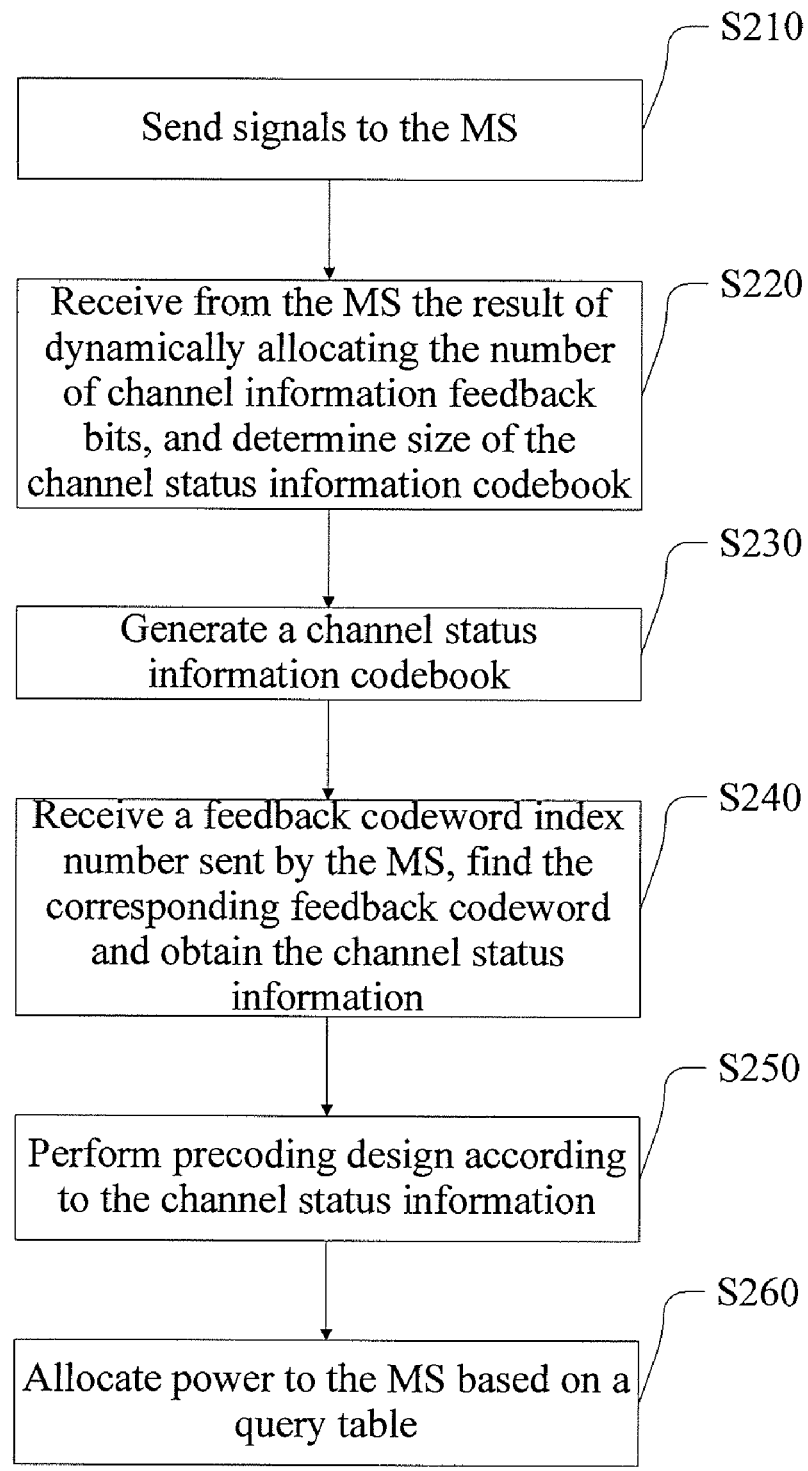
FIG. 8 is a schematic diagram of an information processing method according to an embodiment of the present invention.

As shown in FIG. 8, in another embodiment, after the BS performs precoding design, the method may further include:

S260. Set a different power allocation factor for each MS according to a preset query table, and allocate power to each MS.

In a Co-MIMO communication scenario shown in FIG. 1, the signals on the communication channel of the MSs at the edge of a cell are weaker than the signals on the communication channel of the MSs at the center of the cell. Through the method of allocating channel information feedback bits dynamically in the embodiment of the present invention, the MSs at the center of the cell accomplish a large gain of communication performance. Further, a power allocation policy based on a query table is provided in an embodiment of the present invention, so that communication performance of MSs at the edge of the cell is improved without impairing the communication performance of MSs at the center of the cell. That is, by allocating the number of channel information feedback bits dynamically in the embodiment of the present invention, the performance of the MSs in the cell (especially the MSs at the center of the cell) is improved significantly. Through the power allocation policy provided in the embodiment of the present invention, a part of the performance enhanced for the MSs at the center of the cell is transferred to the MSs at the edge of the cell, and therefore, the communication performance of the MSs at the edge of the cell is improved without impairing the performance of the MSs at the center of the cell.

In an embodiment of the present invention, a query table is preset, a different power allocation factor is set for each MS according to the preset query table, and power is allocated to each MS according to the power allocation factor. To help persons of ordinary skill in the art better understand the power allocation policy provided by the embodiment of the present invention, the following gives more details by citing the communication scenario shown in FIG. 7:

As shown in FIG. 2, two neighboring BSs coordinate to serve two MSs. In this scenario, N=2 (number of BSs), K=2 (number of MSs), $n_T$=4 (number of transmitting antennas, and $n_R$=2 (number of receiving antennas). The two BSs have the same distance to MS2, but the distance from MS1 to BS1 is shorter than the distance from MS1 to BS2. In this way, relative to MS1, MS2 is located at the edge of the cell. After the overall performance of the system is improved, more power may be allocated to MS2 to improve performance of MS2 without impairing performance of MS1.

In the existing mechanism, the BS allocates power to two MSs equally. Therefore, $$p_1 = p_2 = p \quad (11)$$

In the embodiment of the present invention, a simple power allocation policy is applied:

$$p_1 = (1-\alpha)p \quad (12)$$

$$p_2 = (1+\alpha)p \quad (13)$$

In the formulae above, a is a power allocation factor, which is a function of the transmitting power of each BS (p), distance between BS1 and MS1 (d), total number of channel information feedback bits (B), and policy of allocating channel information feedback bits (s):

$$\alpha = f(p, d, B, s) \quad (14)$$

In the embodiment of the present invention, a proper a value is found through search in a query table. The query table is constructed through offline emulation. That is, the query table is preset through emulation. In an embodiment, query table 3 may be constructed according to formula (14):

In other embodiments, α in the query table may be another value, depending on the policy of allocating channel information feedback bits (s), transmitting power of each BS (p), distance between BS1 and MS1 (d), and total number of channel information feedback bits (B).

To help persons of ordinary skill in the art better understand the embodiment of the present invention, the process of constructing an α query table is detailed below through examples:

(1) Initialize a given (p, d, B, s):

$$p_{1b}=p, p_{2b}=p, \alpha=0, p_{1p}=(1-\alpha)p, p_{2p}=(1+\alpha)p.$$

The subscript b indicates that the existing baseline scheme is adopted; the subscript p indicates that the proposed scheme in the embodiment of the present invention is adopted.

(2) Perform an Iteration Operation (a) Calculate ergodic capacity $c_{1b}$ and ergodic capacity $c_{1p}$ if the criteria of measurement is an ergodic capacity.

Calculate outage probability $p_{out1b}$ and outage probability $p_{out1p}$ if the criteria of measurement is an outage probability.

(b) Abort if $|c_{1b}-c_{1p}|<\epsilon$ or $|p_{out1b}-p_{out1p}|<\epsilon$, ($\epsilon$ is a preset value) or the maximum number of iterations is hit.

If $c_{1p}<c_{1b}$ or $p_{out1p}>p_{out1b}$ then $$\alpha^k = \alpha^{k-1} - \frac{2}{3}\delta^{k-1} \quad (15)$$

Otherwise, $\alpha^k=\alpha^{k-1}+\delta^k$ (16). In this case, return to (a).

In the formulae above, $c_{1b}$ is an ergodic capacity of MS1 in the reference scheme, $c_{1p}$ is an ergodic capacity of MS1 in the scheme proposed in the solution of the present invention, $p_{out1b}$ is an outage probability of MS1 in the reference scheme, $p_{out1p}$ is an outage probability of MS1 in the scheme proposed in the solution of the present invention, $\alpha^k$ is the iteration value numbered k of α, and $\delta^k$ is an increased step length of α and depends on $(c_{1p}-c_{1b})$ or $(p_{out1b}-p_{out1p})$.

TABLE 3

Power factor query table

| | d (km) | | | | | | | | | |
|---|---|---|---|---|---|---|---|---|---|---|
| | 0.15 | 0.20 | 0.25 | 0.30 | 0.35 | 0.40 | 0.45 | 0.50 | 0.55 | 0.60 |
| α | 0.2880 | 0.2800 | 0.2713 | 0.2513 | 0.2240 | 0.1373 | 0.1080 | 0.0780 | 0.0540 | 0.0333 |

In another embodiment, the policy of allocating channel information feedback bits (s) may change (the possibility of the change is detailed in step S120 in the embodiments shown in FIG. 3-FIG. 5). In this case, query table 4 may be constructed:

When the step length $\delta^k$ depends on $(c_{1p}-c_{1b})$, the values of the step length in the embodiment are shown in Table 5, and the values of α are shown in Table 2 (for any reasonable p and d, B=8 bits, of which 6 bits are allocated to $H_{11}$ and 2 bits are allocated to $H_{12}$).

TABLE 4

Power factor query table

| | d (km) | | | | | | | | | |
|---|---|---|---|---|---|---|---|---|---|---|
| | 0.15 | 0.20 | 0.25 | 0.30 | 0.35 | 0.40 | 0.45 | 0.50 | 0.55 | 0.60 |
| α | 0.3987 | 0.3940 | 0.3793 | 0.3520 | 0.3120 | 0.1173 | 0.1020 | 0.0800 | 0.0600 | 0.0380 |

TABLE 5

Examples of step length values

| | (c$_{1p}$-c$_{1b}$) | | | | | |
|---|---|---|---|---|---|---|
| | >=0.5 | >=0.4 | >=0.3 | >=0.2 | >=0.0 | >=0.05 |
| δ$^k$ | 0.12 | 0.1 | 0.08 | 0.06 | 0.04 | 0.006 |

Figure 15:
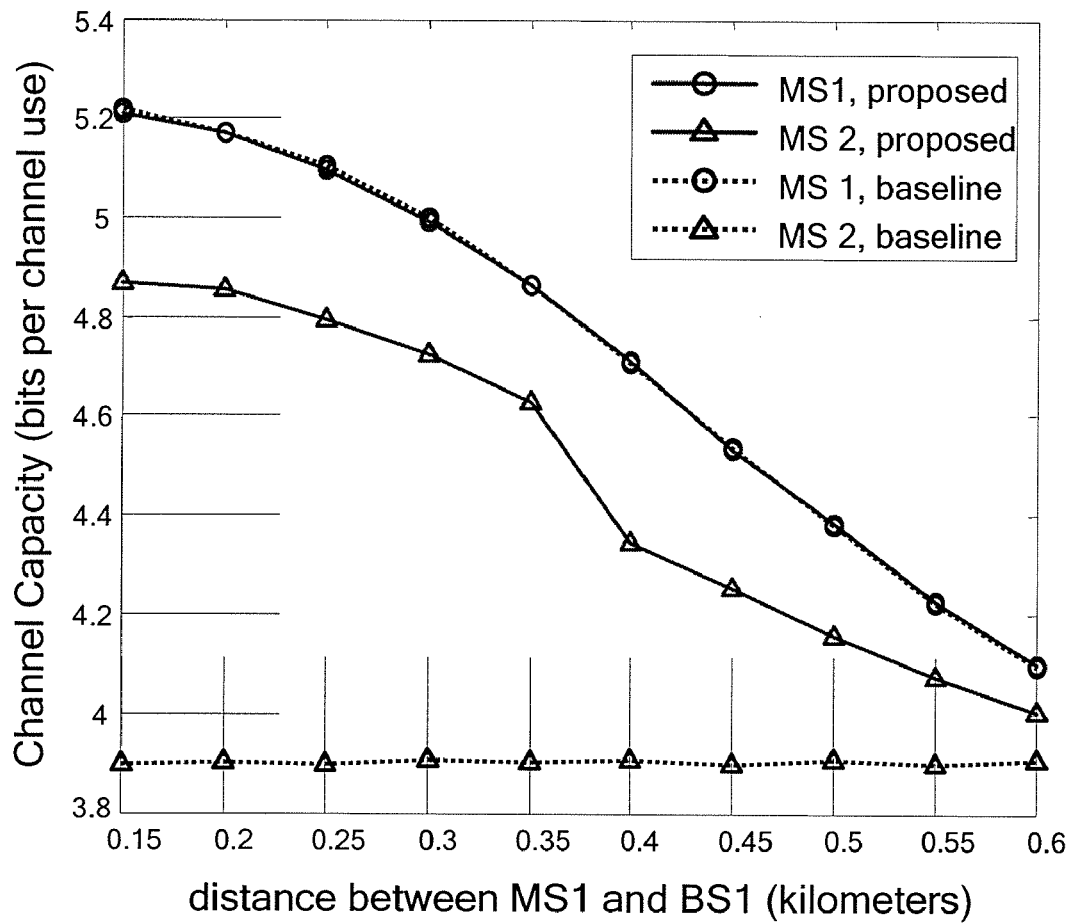
FIG. 15 is a schematic diagram of improving performance through a power allocation policy according to an embodiment of the present invention.

If the criteria of measurement is an ergodic capacity, as shown in FIG. 15, the communication scenario shown in FIG. 2 is emulated by applying the power allocation policy proposed in the embodiment. As revealed in the emulation diagram, after the power allocation scheme proposed in this embodiment is applied, MS2 has an obviously higher channel capacity as against MS2 that does not employ the power allocation scheme proposed in the embodiment. Meanwhile, the channel capacity of MS1 does not change obviously. Therefore, through the power allocation policy proposed in the embodiment of the present invention, after the overall performance of the system is improved, more power is allocated to MS2 so that the performance of MS2 is improved without impairing the performance of MS1.

In another embodiment, step length δ$^k$ depends on the outage probability. Because the outage probability is correlated to ergodic capacity c$_{1b}$ and ergodic capacity c$_{1p}$, the scheme is essentially the same.

Figure 16:
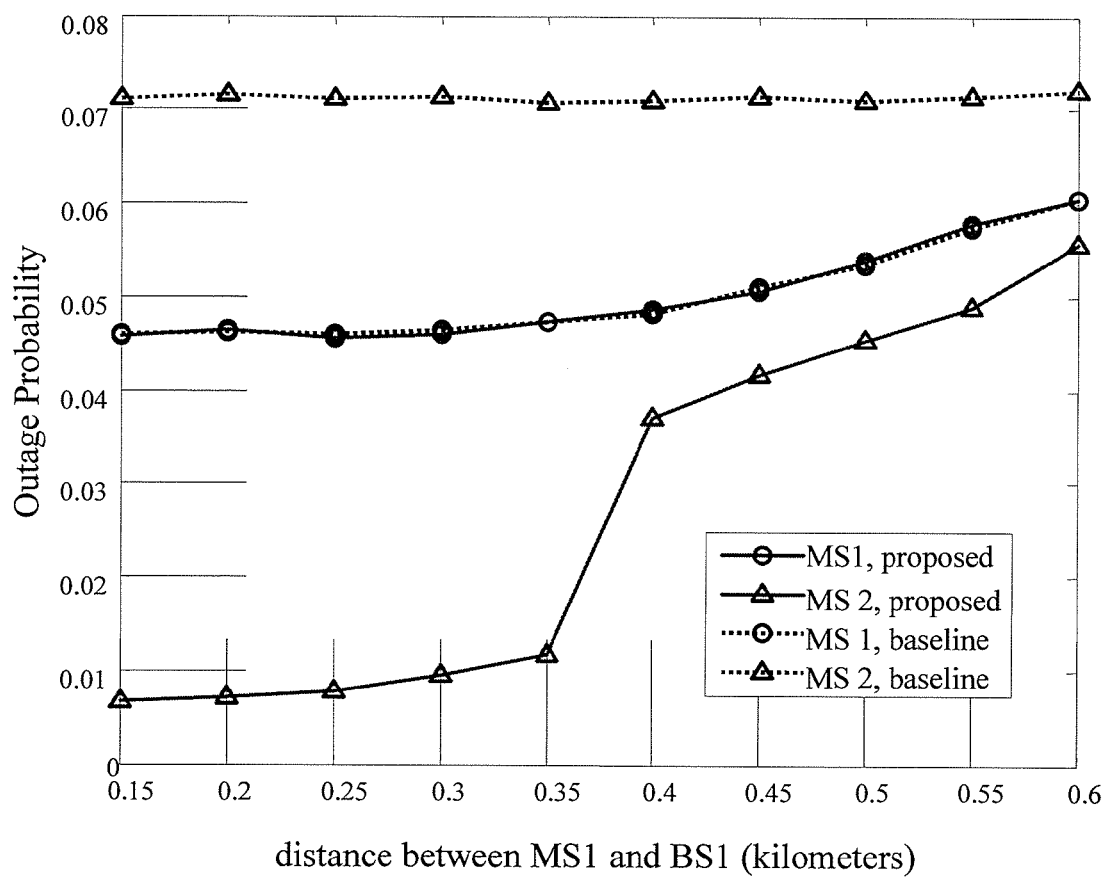
FIG. 16 is a schematic diagram of improving performance through a power allocation policy according to an embodiment of the present invention.

In another embodiment of the present invention, the criteria of measurement is an outage probability. In this case, the communication scenario shown in FIG. 2 is emulated by applying the power allocation policy proposed in the embodiment. The emulation result is shown in FIG. 16.

As revealed in the emulation diagram, after the power allocation scheme proposed in the embodiment of the present invention is applied, MS2 has an obviously lower outage probability as against MS2 that does not employ the power allocation scheme proposed in this embodiment. Meanwhile, the outage probability of MS1 does not change obviously. Therefore, through the power allocation policy proposed in the embodiment of the present invention, after the overall performance of the system is improved, more power is allocated to MS2 so that the performance of MS2 is improved without impairing the performance of MS1.

In the foregoing technical solutions, on the basis of allocating channel information feedback bits to each channel dynamically, a power allocation policy proposed in an embodiment of the present invention is searched out in an offline query table, and a method for controlling performance of MSs at the center of the cell and performance of MSs at the edge of the cell flexibly is disclosed. In this way, the number of channel information feedback bits is allocated to each channel dynamically according to the quality of each channel, and the channel information is fed back more efficiently. Moreover, through a new power allocation policy, the communication performance of the MSs at the edge of the cell is improved significantly without impairing performance of the MSs at the center of the cell.

Figure 9:
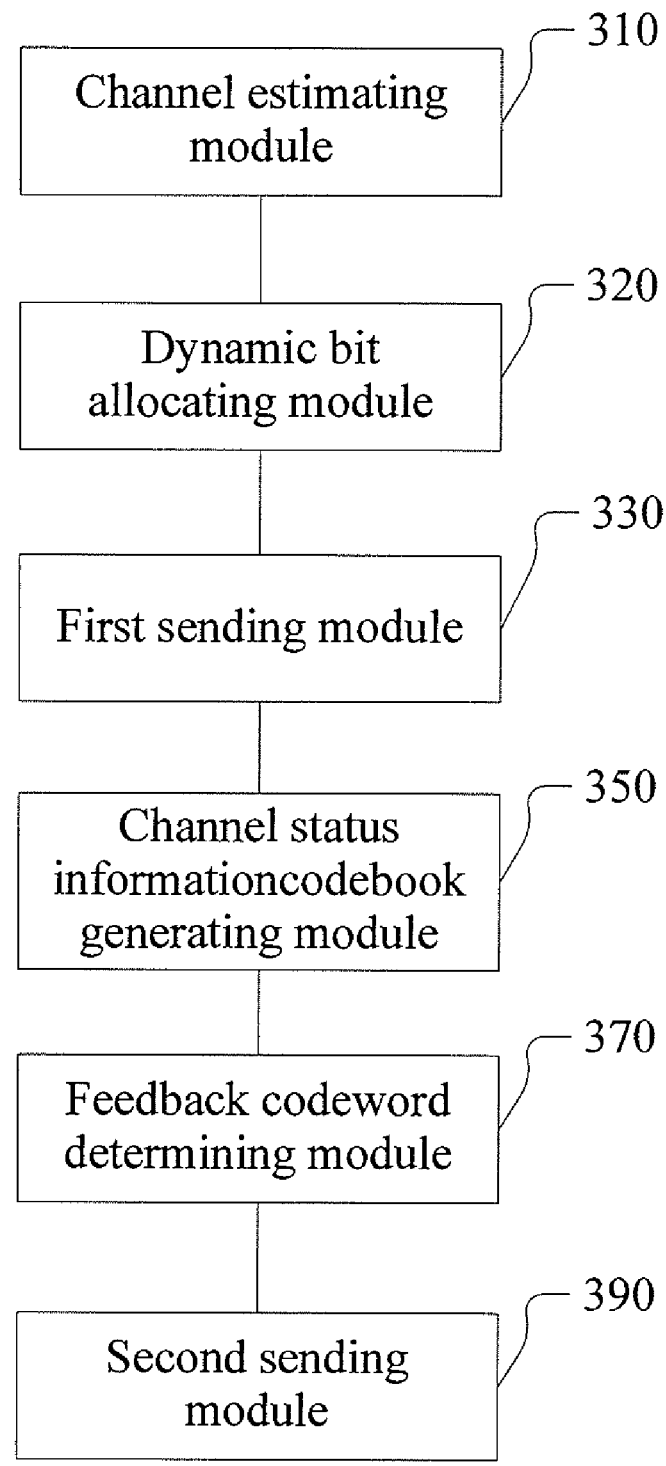
FIG. 9 is a schematic structure diagram of an MS according to an embodiment of the present invention.

As shown in FIG. 9, an MS is provided in an embodiment of the present invention. The MS includes a channel estimating module /310, a dynamic bit allocating module 320, a first sending module 330, a channel state information codebook generating module 350, a feedback codeword determining module 370, and a second sending module 390.

The channel estimating module 310 is configured to perform channel estimation according to information received from a BS.

Channel estimation may be a process of estimating model parameters of a presumed channel model according to received data. Channel estimation may provide channel state information required by the MS.

After receiving the information sent by the BS, the channel estimating module 310 performs channel estimation according to the information sent by the BS. In an embodiment, the information sent by the BS may include a preset pilot signal. In this way, the channel estimating module 310 can estimate the channel between the MS and the BS through a channel estimation algorithm according to the pilot signal preset in the information, so as to obtain channel model parameters, namely, obtain a channel matrix model. In an embodiment, the pilot signal is periodically inserted into the information sent by the BS. In another embodiment, the information to be sent is split into multiple data blocks beforehand, and multiple pilot signals are interpolated between the data blocks at intervals.

The channel estimation algorithm in an embodiment may be a least square channel estimation algorithm; the channel estimation algorithm in another embodiment may be a maximum likelihood estimation algorithm; and the channel estimation algorithm in another embodiment may be an MMSE estimation algorithm or a MAP estimation algorithm.

In another embodiment, a training sequence is added in the information that is to be sent beforehand to take place of the pilot signal. In this way, after receiving the information sent by the BS, the channel estimating module 310 can estimate the channel between the MS and the BS through a channel estimation algorithm according to the training sequence, so as to obtain channel model parameters, namely, obtain a channel matrix model. The training sequence in an embodiment may be signals of continuous blocks separated from the information sent by the BS; the training sequence in another embodiment may be inserted averagely in the information sent by the BS.

The channel estimation algorithm in an embodiment may be a least square channel estimation algorithm; the channel estimation algorithm in another embodiment may be a maximum likelihood estimation algorithm; and the channel estimation algorithm in another embodiment may be an MMSE estimation algorithm or a MAP estimation algorithm.

It can be understandable that in an embodiment, the channel estimation may be carried out through blind estimation. Blind estimation requires no training sequence or pilot signals, and uses the inherent information of the transmitted data to perform channel estimation. In another embodiment, the channel estimation based on pilot signals may be combined with the blind estimation to perform channel estimation, or the channel estimation based on the training sequence is combined with the blind estimation to perform channel estimation.

After the channel estimation, a channel matrix model between the MS and the BS is obtained, as detailed below:

Suppose that each BS has n$_T$ transmitting antennas, and each MS has n$_R$ receiving antennas. Through channel estimation of the channel estimating module 310, the channel from the transmitting antenna numbered n (transmitting antenna n) of the BS to receiving antenna m of the MS is expressed as H$_{mn}$, and is modeled as:

$$H_{mn} = \sqrt{\frac{d_{mn}^{-\gamma}}{d_0}} H_{mn}^w \qquad (1)$$

In the formula above, $d_{mn}$ is a distance from transmitting antenna n of the BS to receiving antenna m of the MS, $d_0$ is a preset standard distance, γ is a path loss factor, $d_{mn}^{-\gamma}$ represents path fading, $H_{mn}^{w}$ represents small-scale Rayleigh fading, and $H_{mn}$ is an $n_R \times n_T$ dimensional matrix. Further, in another embodiment, the MS can obtain $d_{mn}^{-\gamma}$ and $H_{mn}^{w}$ according to formula (1), obtain the path fading data of the channel and the small-scale Rayleigh fading data, and obtain the channel state information such as SNR according to the fading data.

In a Co-MIMO communication system, N BSs provide communication service for the MS in the embodiment simultaneously, where N is time-variant. Suppose that the MS provided in the embodiment is MS numbered m in the system. For MS m, N channel matrices need to be estimated, namely, $H_{mn_1}, H_{mn_2}, \ldots, H_{mn_N}$, and all such matrices have a structure similar to formula (1). Therefore, a total channel matrix can be obtained:

$$H_m = [H_{mn_1} H_{mn_2} \ldots H_{mn_N}] \quad (2)$$

In formula (2), each element of the channel matrix is a submatrix, and is a channel matrix between each BS and MS m, and represents information about all channels between each BS and MS m, namely, includes information about channels from all antennas of the BS to all antennas of the MS. Therefore, in an embodiment, the MS can obtain channel state information such as path fading and corresponding SNR of each channel according to the path fading and small-scale Rayleigh fading of each channel, and can determine the channel that is in a better state according to the channel state information. It can be understandable that in another embodiment, the channel quality may be obtained through measurement. For example, the information such as path loss, receiving SNR, and SINAD ratio is obtained through measurement, and then the channel quality of the channel is calculated or inferred according to a combination of such information.

Figure 10:
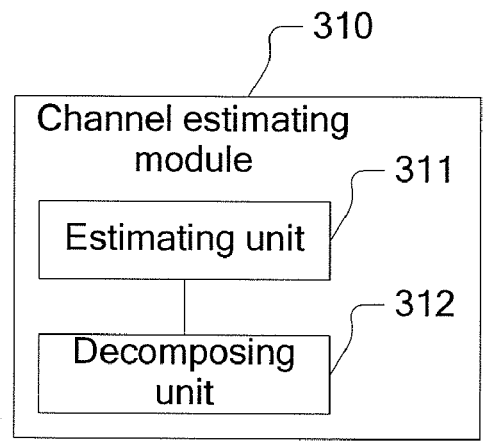
FIG. 10 is a schematic structure diagram of a channel estimating module in another MS according to an embodiment of the present invention.

Specifically, as shown in FIG. 10, in another embodiment, the channel estimating module 301 may include an estimating unit 311 and a decomposing unit 312.

The estimating unit 311 is configured to perform channel estimation for each channel to obtain a channel matrix of the channel.

The estimating unit 311 estimates the channel matrix of the channel according to the information received from the BS.

The steps of estimating the channel matrix have been detailed in the embodiments shown in FIG. 3-FIG. 5, and are not repeated herein any further.

The decomposing unit 312 is configured to decompose the channel matrix to obtain a channel direction information matrix of each channel, where the channel direction information matrix of each channel includes channel state information of each channel.

The steps of decomposing the channel matrix have been detailed in the embodiments shown in FIG. 3-FIG. 5, and are not repeated herein any further.

The dynamic bit allocating module 320 is configured to allocate the number of channel information feedback bits to each channel dynamically according to quality of the channel.

In a cellular system with finite feedback, the total number of allocated bits is a preset finite number. In a Co-MIMO communication system, channel quality of each channel is not completely the same. Through a preset policy of allocating bits dynamically, different numbers of channel information feedback bits are allocated to the channels of different quality, which makes better use of feedback gain.

Specifically, as against the averagely allocated number of channel information feedback bits, the number of channel information feedback bits allocated to a channel of higher quality is greater. Therefore, the greater number of channel information feedback bits bears more channel state information than the average number of channel information feedback bits. For the channels of low quality, the average number of channel information feedback bits is enough for bearing all channel state information. In this way, less channel information feedback bits may be allocated to the channels that are in a worse state, and more channel information feedback bits are allocated to the channels that are in a better state. In this way, the finite total number of channel information feedback bits can be made better use of, and the channel state information provided for the BS is as complete as possible. The BS adjusts the transmitting power according to the channel information so that the receiver can receive better gain as against the averagely allocated number of channel information feedback bits.

In an embodiment, the channel quality is strongly related to the distance between the BS and the MS. Therefore, an MS closer to the BS has higher channel quality. For example, in an embodiment, two BSs coordinate to serve one MS. When the MS is closer to BS1 than BS2, the channel between BS1 and the MS has higher quality than the channel between BS2 and the MS.

In a cellular system with finite feedback, the total number of allocated bits is a preset finite number. Supposing that a total of 8 channel information feedback bits are used for feeding back channel information, 5 channel information feedback bits may be allocated to the channel between BS1 and the MS, and 3 channel information feedback bits may be allocated to the channel between BS2 and the MS. In another embodiment, 6 channel information feedback bits may be allocated to the channel between BS1 and the MS, and 2 channel information feedback bits may be allocated to the channel between BS2 and the MS. In a cellular system with finite feedback, performance gain (SNR gain or capacity gain) is a function of the average SNR and the number of channel information feedback bits. Therefore, the MS allocates the number of channel information feedback bits to each channel dynamically according to the quality of each channel, which can enhance the system performance.

In another embodiment, different levels of the channel quality may be reflected by different SINRs. Therefore, according to the SINR, through a preset policy of allocating bits dynamically, different numbers of channel information feedback bits are allocated to the channels of different SINR. In an embodiment, the SINR may be inferred according to path loss, receiving SNR, or SINAD ratio, or according to a combination of such information, where the path loss, receiving SNR, or SINAD ratio is estimated on the MS side by the channel estimating module 310; or, the SINR may be inferred according to path loss, receiving SNR, or SINAD ratio, or according to a combination of such information, where the path loss, receiving SNR, or SINAD ratio is obtained through measurement.

The steps of allocating the feedback bits dynamically have been detailed in step S120 in the embodiments shown FIG. 3-FIG. 5, and are not repeated herein any further.

The first sending module 330 is configured to send a result of allocating the number of channel information feedback bits.

After the dynamic bit allocating module 320 allocates the channel information feedback bits dynamically, the allocation result needs to be sent to the BS. In this way, after receiving the allocation result, the BS acquires the number of channel information feedback bits allocated to the channel between the BS and the MS, and generates a channel state information codebook according to the allocated number of channel information feedback bits, where the channel state information codebook is consistent with the channel state information codebook on the MS.

The channel state information codebook generating module 350 is configured to determine size of the channel state information codebook of each channel according to the number of channel information feedback bits dynamically allocated by the dynamic bit allocating module 320, and generate a channel state information codebook;

The size of the channel state information codebook of each channel between the BS and the MS depends on the number of channel information feedback bits allocated to the channel. For example, if k channel information feedback bits are allocated to a channel, the size of the channel state information codebook of the channel is $2^k$. In the embodiment of the present invention, different numbers of channel information feedback bits are allocated to the channels with different channel quality, and therefore, the channel state information codebooks of different sizes are applied to the channels with different channel quality. In this way, the channel with higher channel quality uses a larger codebook that includes more codeword information.

After the size of the channel state information codebook is determined, the channel state information codebook generating module 350 in the embodiment can generate a Grassmannian codebook through a Lloyd algorithm, and use the codebook as a channel state information codebook. It can be understandable that in another embodiment, the channel state information codebook may be generated through a GLA.

It should be noted that in an embodiment, the result of allocating channel information feedback bits may be sent to the BS directly; in another embodiment, the result of allocating channel information feedback bits may be sent to a forwarding apparatus, and the forwarding apparatus forwards the result to the BS.

The feedback codeword determining module 370 is configured to determine a feedback codeword in the channel state information codebook generated by the channel state information codebook generating module 350.

After the channel state information codebook is generated by the channel state information codebook generating module 350, a best codeword needs to be found as a feedback codeword for the channel state information that is to be fed back in order to feed back the channel state information in a codebook of a $2^k$ size (k is the allocated number of channel information feedback bits). In this way, the feedback codeword can feed back the channel state information as complete as possible.

Chordal distances between each of the codewords in the codebook and the channel direction information matrix estimated by the channel estimating module 310 are compared, a codeword having the shortest chordal distance to the channel direction information matrix is used as a feedback codeword, and the index number of the feedback codeword is sent to the BS. For example, if the $16^{th}$ codeword is used as a feedback codeword, the index number "16" is fed back to the BS, and the BS finds the codeword corresponding to the index number "16" and obtains the channel state information fed back by the codeword.

The steps of selecting a codeword according to chordal distance have been detailed in the embodiments shown in FIG. 3-FIG. 5, and are not repeated herein any further.

The second sending module 390 is configured to send an index number of the feedback code.

It should be noted that in an embodiment, the index number of the feedback codeword may be sent to the BS directly; in another embodiment, the index number of the feedback codeword may be sent to a forwarding apparatus, and the forwarding apparatus forwards the index number to the BS.

It should be noted here that after the first sending module 330 feeds back the allocation result to the BS, the BS acquires the number of channel information feedback bits allocated to the channel between the BS and the MS, and generates a channel state information codebook according to the allocated number of channel information feedback bits, where the channel state information codebook has the same size as the channel state information codebook on the MS.

Because the BS and the MS agree on the codebook, the BS can search the codebook according to the received index number to obtain the feedback codeword, and obtains the channel state information of the downlink channel according to the feedback codeword.

Through the foregoing technical solutions of the present invention, the number of channel information feedback bits is allocated to each channel dynamically according to the channel estimation result, the size of a channel state information codebook of each channel is determined according to the allocated number of channel information feedback bits, a codebook of the same size is generated on the BS and on the MS simultaneously for the same channel, and a codeword for feeding back channel state information is determined in the codebook. For a given total number of channel information feedback bits, the MS dynamically allocates the channel information feedback bits to different channels more reasonably, and makes better use of the feedback gain. In an embodiment of the present invention, more BSs may participate in Co-MIMO communication, and the channel information feedback bits are allocated and the channel state information codebook is processed for each coordinating BS instead of regarding all coordinating BSs as a "super BS". Based on the state of the channel between each coordinating BS and the MS, the processing is flexible, and the processing flexibility is improved.

Figure 11:
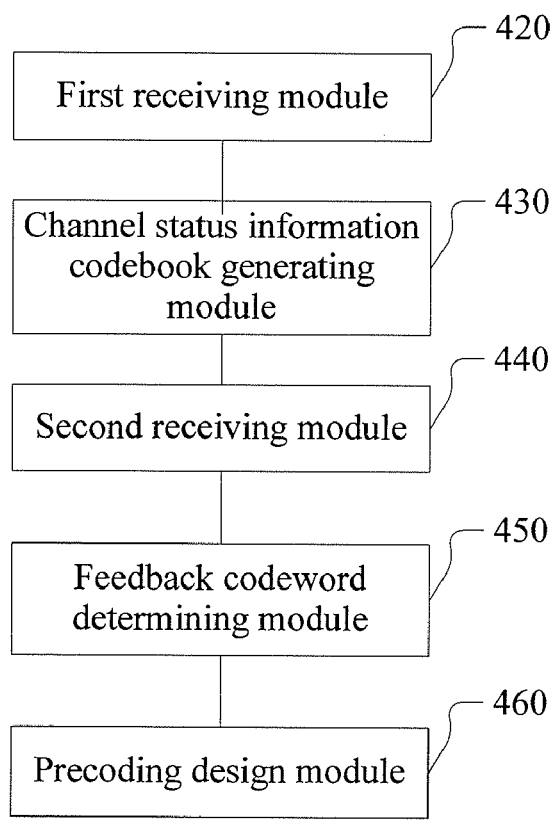
FIG. 11 is a schematic structure diagram of a BS according to an embodiment of the present invention.

As shown in FIG. 11, a BS is provided in an embodiment of the present invention. The BS includes a first receiving module 420, a channel state information codebook generating module 430, a second receiving module 440, a feedback codeword determining module 450, and a precoding design module 460.

The first receiving module 420 is configured to receive a dynamic allocation result sent by an MS, where the dynamic allocation result is a result of the MS allocating the number of channel information feedback bits to each channel dynamically according to quality of the channel.

In a cellular system with finite feedback, the total number of allocated bits is a preset finite number. In a Co-MIMO communication system, the quality of each channel is not completely the same. Through a preset policy of allocating bits dynamically, different numbers of channel information feedback bits are allocated to the channels of different quality, which makes better use of feedback gain.

Different levels of the channel quality may be reflected by different SINR values. Therefore, according to the SINR, through a preset policy of allocating bits dynamically, different numbers of channel information feedback bits are allocated to the channels of different SINR. The SINR may be inferred according to the information such as path loss, receiving SNR, or SINAD ratio, or according to a combination of such information, where the path loss, receiving SNR, or SINAD ratio is obtained through channel estimation or measurement on the MS.

The channel state information codebook generating module 430 is configured to determine size of a channel state information codebook according to the allocation result received by the first receiving module 420, and generate a channel state information codebook.

The channel state information codebook generated by the channel state information codebook generating module 430 is the same as the channel state information codebook generated on the MS according to the number of channel information feedback bits allocated to each channel. The channel state information codebook has been detailed in the embodiments shown in FIG. 3-FIG. 5 and is not repeated herein any further.

The second receiving module 440 is configured to receive a feedback codeword index number sent by an MS, where the index number is an identifier of a feedback codeword.

The feedback codeword is determined, according to the channel state information estimated through channel estimation, by the MS in the channel state information codebook generated on the MS. The determining method has been detailed in the embodiments shown in FIG. 3-FIG. 5, and is not repeated herein any further.

The feedback codeword determining module 450 is configured to find, according to the feedback codeword index number, a corresponding feedback codeword in the channel state information codebook generated by the channel state information codebook generating module 430, and obtain channel state information fed back by the MS in the feedback codeword.

The precoding design module 460 is configured to perform precoding design according to the channel state information obtained by the feedback codeword determining module.

Through the foregoing technical solutions of the present invention, different number of channel information feedback bits is allocated to each channel dynamically according to the channel state, a channel state information codebook of a different size is generated for each channel according to the allocated number of channel information feedback bits, and precoding design is performed according to the channel state information that is fed back by the feedback codeword and is provided by the channel state information codebook. In this way, the feedback gain is made full use of.

Figure 12:
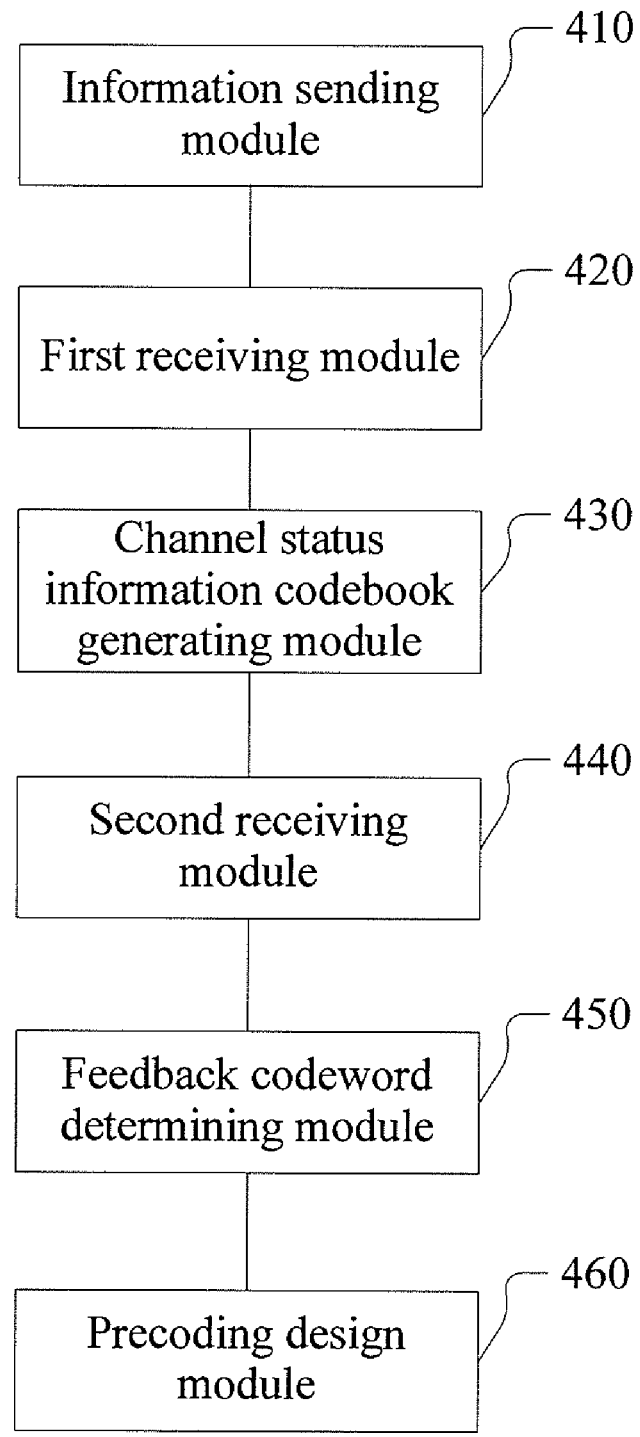
FIG. 12 is a schematic structure diagram of a BS according to an embodiment of the present invention.

As shown in FIG. 12, a BS is provided in an embodiment of the present invention. The BS includes an information sending module 410, a first receiving module 420, a channel state information codebook generating module 430, a second receiving module 440, a feedback codeword determining module 450, and a precoding design module 460.

The information sending module 410 is configured to send information to the MS, where the information carries relative information for the MS to perform channel estimation.

The channel estimation information in the information sent by the sending module 410 may be a preset pilot signal in an embodiment. In this way, the MS can estimate the channel between the MS and the BS through a channel estimation algorithm according to the pilot signal preset in the information, so as to obtain channel model parameters, namely, obtain a channel matrix model. In an embodiment, the pilot signal is inserted into the information sent by the BS periodically. In another embodiment, the information to be sent is split into multiple data blocks beforehand, and multiple pilot signals are interpolated between the data blocks at intervals.

In another embodiment, a training sequence is added in the information to be sent beforehand to take place of the pilot signal. In this way, after receiving the information sent by the BS, the MS can estimate the channel between the MS and the BS through a channel estimation algorithm according to the training sequence, so as to obtain channel model parameters, namely, obtain a channel matrix model. The training sequence in an embodiment may be signals of continuous blocks separated from the information sent by the BS; the training sequence in another embodiment may be inserted averagely in the information sent by the BS.

After performing channel estimation according to the information sent by the BS, the MS determines quality of each channel according to the channel estimation result, and allocates channel information feedback bits to the channel between the MS and each of different BSs dynamically according to the result of channel estimation. That is, the MS allocates different numbers of channel information feedback bits to the channels of different quality dynamically, and feeds back the allocation result to the BS.

The first receiving module 420 is configured to receive the dynamic bit allocation result sent by an MS, where the allocation result is a result of the MS allocating the number of channel information feedback bits to each channel dynamically according to a channel estimation result after the MS performs channel estimation according to the information sent by the information sending module 410.

The dynamic allocation result is a result obtained through the process that after the MS performs channel estimation according to the information sent by the information sending module 410, the MS determines the channel quality of each channel according to the result of channel estimation, and the MS allocates the number of channel information feedback bits to each channel dynamically. According to the channel estimation result, if a channel has higher quality, more channel information feedback bits are allocated for the channel so that more channel state information can be borne. In this way, the BS can obtain more channel state information and increase the gain of the receiver by taking a series of actions such as re-adjusting the transmitting power of information. If a channel has lower quality, a small number of feedback bits are allocated for the channel because the allocated channel information feedback bits are enough for bearing the channel state information of the channel. In this way, more channel information feedback bits can be saved and allocated to the channels of higher quality.

The channel state information codebook generating module 430 is configured to determine size of a channel state information codebook according to the allocation result, and generate a channel state information codebook.

The size of the channel state information codebook C of a channel between each coordinating BS and the MS depends on the number of channel information feedback bits allocated to this channel. For example, if the MS allocates k channel information feedback bits to a channel, the size of the channel state information codebook of the channel is $2^k$. In the embodiment of the present invention, the MS allocates different numbers of channel information feedback bits to the channels with different channel quality, and therefore, the channel state information codebooks of different sizes are applied to the channels with different channel quality. In this way, the channel with higher channel quality uses a larger codebook that includes more codeword information.

After the size of the channel state information codebook is determined, the BS in this embodiment can generate a Grassmannian codebook through a Lloyd algorithm, and use this codebook as a channel state information codebook. It can be understandable that in another embodiment, the channel state information codebook may be generated through a GLA. In this case, a codebook may be generated on the MS side according to the allocated number of channel information feedback bits, where the codebook is consistent with the codebook on the BS side, which has been detailed in the embodiments shown in FIG. 3-FIG. 5, and is not repeated herein any further.

The second receiving module 440 is configured to receive a feedback codeword index number sent by the MS, where the feedback codeword index number is an identifier of the feedback codeword which is determined, according to the channel state information obtained through channel estimation, by the MS in a channel state information codebook generated on the MS side.

The feedback codeword determining module 450 is configured to find, according to the feedback codeword index number received by the second receiving module 440, a corresponding feedback codeword in the channel state information codebook generated by the channel state information codebook generating module 430, and obtain channel state information fed back by the feedback codeword according to the feedback codeword.

Because the BS and the MS agree on the codebook, the feedback codeword determining module 450 can find, according to the index number received by the receiving module 440, a best codeword (namely, feedback codeword) determined by the MS in the channel state information codebook generated by the channel state information codebook generating module 430; and can obtain the channel state information of the downlink channel between the BS and the MS according to the feedback codeword.

The precoding design module 460 is configured to perform precoding design according to the channel state information fed back by the feedback codeword determined by the feedback codeword determining module 450.

After an information sending and processing apparatus collects all channel state information fed back by the MS, the precoding design module 460 starts to perform precoding design. That is, after the MS feeds back channel state information of channels between the MS and all coordinating BSs to the information sending and processing apparatus, the precoding design module 460 starts to perform precoding design.

In the embodiment, the precoding design is based on a zero-forcing linear precoding algorithm, for example. In another embodiment, a block-orthogonality zero-forcing linear precoding algorithm or a matched filter precoding algorithm may be applied.

It can be understandable that in another embodiment, a nonlinear precoding algorithm such as dirty paper coding algorithm, nonlinear sending zero-forcing precoding algorithm, or THP precoding algorithm may be applied instead, which involve much complexity of implementation though.

Through the foregoing technical solutions, the number of channel information feedback bits is allocated to each channel dynamically according to the channel estimation result, the size of a channel state information codebook of each channel is determined according to the allocated number of channel information feedback bits, a codebook of the same size is generated on the BS and on the MS simultaneously for the same channel, and a codeword for feeding back channel state information is determined in the codebook. For a given total number of channel information feedback bits, the MS allocates dynamically different number of channel information feedback bits to channels of different quality more reasonably, and makes better use of the feedback gain. In an embodiment of the present invention, more BSs may participate in Co-MIMO communication, and the channel information feedback bits are allocated and the channel state information codebook is processed for each coordinating BS instead of regarding all coordinating BSs as a "super BS". Based on the state of the channel between each coordinating BS and the MS, the processing is flexible, and the processing flexibility is improved.

Figure 13:
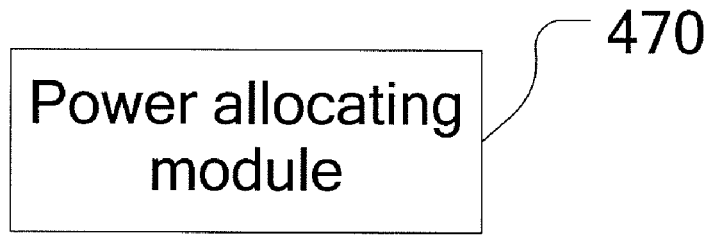
FIG. 13 is a schematic structure diagram of a power allocating module in a BS according to an embodiment of the present invention.
Figure 14:
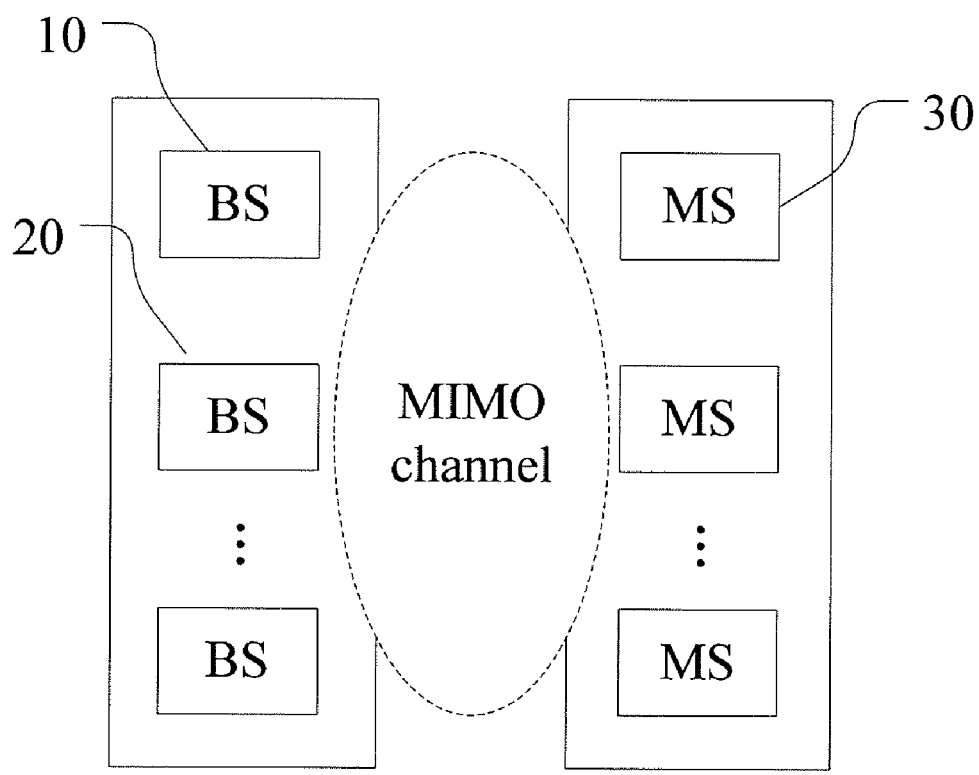
FIG. 14 is a schematic diagram of a MIMO system according to an embodiment of the present invention.

As shown in FIG. 13, in another embodiment, the BS in FIG. 11 and FIG. 12 may further include:

a power allocating module 470, configured to set a different power allocation factor for each MS according to a preset query table, and allocate power to each MS.

Through a query table constructed beforehand, after the overall performance of the system is enhanced through dynamic allocation of channel information feedback bits, a different power allocation factor is allocated to each MS according to an offline query table provided in the embodiment, and power is allocated to each MS according to the power allocation factor. A part of larger communication performance gain obtained at the center of the cell is transferred to the MSs at the edge of the cell. In this way, the performance of MSs at the edge of the cell is improved without impairing the performance of MSs at the center of the cell. The power allocation policy has been detailed in the embodiment shown in FIG. 8, and is not repeated herein any further.

In the foregoing technical solutions, on the basis of allocating channel information feedback bits to each channel dynamically, a power allocation policy proposed in an embodiment of the present invention is searched out on the basis of an offline query table, and a method for controlling performance of MSs at the center of the cell and performance of MSs at the edge of the cell flexibly is disclosed. In this way, different number of channel information feedback bits is allocated dynamically according to different channel quality of the MS located differently in the cell, and the channel state information is fed back more efficiently. Moreover, through a new power allocation policy, the communication performance of the MSs at the edge of the cell is improved significantly without impairing performance of the MSs at the center of the cell.

As shown in FIG. 11, a MIMO communication system is provided in an embodiment of the present invention. The system includes:

at least two BSs (BS10 and BS20), and at least one MS30.

The MS 30 is configured to: perform channel estimation according to information sent by the BS10 and the BS20, namely, estimate the channel matrix between the MS30 and the BS10, and the channel matrix between the MS30 and the BS20; allocate dynamically different numbers of channel information feedback bits to the channels of different quality according to quality of each channel, namely, if a channel has higher quality, allocate more channel information feedback bits to the channel; and feedback a allocation result to the BS10 and the BS20; determine size of a channel state information codebook of each channel according to the number of channel information feedback bits allocated to each channel, and generate a channel state information codebook; and determine a feedback codeword in the generated channel state information codebook according to the channel state information included in a channel matrix estimated through channel estimation, and feed back an index number of the feedback codeword to the BS10 and the BS20.

The BS10 and the BS20 are configured to: send information to the MS30, where the information includes channel estimation information available to the MS30; receive from the MS30 the result of allocating the number of channel information feedback bits; determine, according to the allocation result, size of a channel state information codebook of a channel leading to the MS30, and generate a channel state information codebook; receive a feedback codeword index number sent by the MS30, and find a feedback codeword in the channel state information codebook according to the index number; and perform precoding design according to the channel state information fed back by the feedback codeword.

In another embodiment, the BS10 and the BS20 are further configured to allocate power to the MS according to a preset query table. The allocation policy has been detailed in the embodiments shown in FIG. 7 and FIG. 8, and is not repeated herein any further.

The structure and the functions of the MS30 in an embodiment may be illustrated as the embodiment shown in FIG. 9; or in another embodiment may be illustrated as the embodiment shown in FIG. 9 and FIG. 10.

The structures and the functions of the BS10 and the BS20 in an embodiment may be illustrated as the embodiment shown in FIG. 11; or in another embodiment may be illustrated as the embodiment shown in FIG. 12; or in yet another embodiment may be illustrated as the embodiment shown in FIG. 11 and FIG. 13; or in yet another embodiment maybe illustrated as the embodiment shown in FIG. 12 and FIG. 13.

It can be understandable that the channel quality of each channel may be obtained through channel estimation or channel measurement on the MS side.

Through the foregoing technical solutions, the number of channel information feedback bits is allocated to each channel dynamically according to the channel estimation result, the size of a channel state information codebook of each channel is determined according to the allocated number of channel information feedback bits, a same codebook is generated on the BS and on the MS simultaneously, and a codeword for feeding back channel state information is determined in the codebook. For a given total number of channel information feedback bits, the MS allocates dynamically different numbers of channel information feedback bits to channels of different quality more reasonably, and the BS makes better use of the obtained channel state information to perform precoding design and makes better use of the feedback gain. In the embodiment of the present invention, any number of BSs may participate in Co-MIMO communication, and the channel information feedback bits are allocated and the channel state information codebook is processed for each coordinating BS instead of regarding all coordinating BSs as a "super BS". Based on the state of the channel between each coordinating BS and the MS, the processing is flexible, and the processing flexibility is improved.

Moreover, on the basis of allocating channel information feedback bits to each channel dynamically, a power allocation policy proposed in another embodiment of the present invention is searched out on the basis of an offline query table, and a method for controlling performance of MSs at the center of the cell and performance of MSs at the edge of the cell flexibly is disclosed. In this way, the number of channel information feedback bits is allocated to each channel dynamically according to the quality of each channel, and the channel state information is fed back more efficiently. Moreover, through a new power allocation policy, the communication performance of the MSs at the edge of the cell is improved significantly without impairing performance of the MSs at the center of the cell.

Through the description of the foregoing embodiments, persons of ordinary skill in the art are clearly aware that the embodiments of the present invention may be implemented through hardware, or through software in addition to a necessary universal hardware platform or through the combination of the hardware and the software. Therefore, the technical solutions of the present invention or contributions to the prior art may be embodied in a software product. The software module or the software product of the computer may be stored in a storage media and incorporates several instructions for instructing a computer device (for example, personal computer, server, or network device) to execute the method specified in any embodiment of the present invention. The storage media may be Random Access Memory (RAM), computer memory, Read-Only Memory (ROM), electrically programmable ROM, electrically erasable programmable ROM, register, hard disk, moveable disk, CD-ROM, or any other form of storage media well-known in the art.

The above described embodiments are merely exemplary embodiments of the present invention, but not intended to limit the protection scope of the present invention. Any modifications, variations or replacement that can be easily derived by those skilled in the art shall fall within the protection scope of the present invention.

What is claimed is:

1. A channel information feedback method in a cellular system with finite feedback, comprising:

allocating a number of channel information feedback bits to each channel of multiple channels dynamically according to quality of the channel, wherein against the averagely allocated number of channel information feedback bits, the number of channel information feedback bits allocated to a channel of higher quality is greater;

determining size of a channel state information codebook of each channel according to the number of channel information feedback bits allocated to each channel dynamically, and generating a channel state information codebook;

determining a feedback codeword in the channel state information codebook according to channel state information, wherein the feedback codeword is designed to feed back the channel state information; and sending a result of allocating the number of channel information feedback bits and sending an index number of the feedback codeword, wherein the index number is an identifier of the feedback codeword.

2. The channel state information feedback method according to claim 1, wherein the step of allocating the number of channel information feedback bits to each channel dynamically according to quality of the channel comprises:

allocating different numbers of channel information feedback bits to channels of different quality according to a preset policy of dynamically allocating bits.

3. The channel state information feedback method according to claim 1, wherein:

before determining the feedback codeword in the channel state information codebook according to the channel state information, the method further comprises:

performing channel estimation for each channel to obtain a channel matrix of each channel, and decomposing the channel matrix to obtain a channel direction information matrix of each channel, wherein the channel direction information matrix of each channel comprises the channel state information of each channel.

4. The channel state information feedback method according to claim 3, wherein:

the feedback codeword is a codeword having the shortest chordal distance to the channel direction information matrix, in the channel state infoimation codebook.

5. An information processing method in a cellular system with finite feedback, comprising:
receiving a dynamic allocation result sent by a mobile station, wherein the dynamic allocation result is a result of the mobile station allocating the a number of channel information feedback bits to each channel of multiple channels dynamically according to quality of the channel, wherein against the averagely allocated number of channel information feedback bits, the number of channel information feedback bits allocated to a channel of higher quality is greater;
determining size of a channel state information codebook according to the allocation result, and generating a channel state information codebook;
receiving a feedback codeword index number sent by the mobile station, finding a corresponding feedback codeword in the channel state information codebook according to the feedback codeword index number, and obtaining channel state information fed back by the mobile station from the feedback codeword, wherein the index number is an identifier of the feedback codeword; and
performing precoding design according to the channel state information.

6. The information processing method according to claim 5, wherein: after performing precoding design according to the channel state information, the method further comprises:
setting a different power allocation factor for each mobile station according to a preset query table, and allocating power to each mobile station.

7. A mobile station in a cellular system with finite feedback, comprising:
a dynamic bit allocating module, configured to allocate the a number of channel information feedback bits to each channel of multiple channels dynamically according to quality of the channel, wherein against the averagely allocated number of channel information feedback bits, the number of channel information feedback bits allocated to a channel of higher quality is greater;
a first sending module, configured to send a result of allocating the number of channel information feedback bits;
a channel state information codebook generating module, configured to determine size of a channel state information codebook of each channel according to the number of channel information feedback bits allocated by the dynamic bit allocating module, and generate a channel state information codebook;
a feedback codeword determining module, configured to determine a feedback codeword in the channel state information codebook according to channel state information, wherein the feedback codeword is designed to feed back the channel state information; and
a second sending module, configured to send a feedback codeword index number determined by the feedback codeword determining module, wherein the index number is an identifier of the feedback codeword.

8. The mobile station according to claim 7, further comprising a channel estimating module for estimating channels, wherein the channel estimating module comprises:
an estimating unit, configured to perform channel estimation for each channel to obtain a channel matrix of the channel; and
a decomposing unit, configured to decompose the channel matrix to obtain a channel direction information matrix of each channel, wherein the channel direction information matrix of each channel comprises channel state information of each channel.

9. The mobile station according to claim 8, wherein:
the feedback codeword is a codeword having the shortest chordal distance to the channel direction information matrix in the channel state information codebook.

10. A base station in a cellular system with finite feedback, comprising:
a first receiving module, configured to receive a dynamic allocation result sent by a mobile station, wherein the dynamic allocation result is a result of the mobile station allocating the a number of channel information feedback bits to each channel of multiple channels dynamically according to quality of the channel, wherein against the averagely allocated number of channel information feedback bits, the number of channel information feedback bits allocated to a channel of higher quality is greater;
a channel state information codebook generating module, configured to determine size of a channel state information codebook according to the allocation result, and generate a channel state information codebook;
a second receiving module, configured to receive a feedback codeword index number sent by the mobile station, wherein the index number is an identifier of a feedback codeword;
a feedback codeword determining module, configured to find a corresponding feedback codeword in the channel state information codebook according to the feedback codeword index number received by the second receiving module, and obtain channel state information fed back by the mobile station from the feedback codeword; and
a precoding design module, configured to perform precoding design according to the channel state information obtained by the feedback codeword determining module.

11. The base station according to claim 10, further comprising:
a power allocating module, configured to set a different power allocation factor for each mobile station according to a preset query table, and allocate power to each mobile station.

12. A channel information feedback method in a cellular system using a predetermined number of channel information feedback bits, the method comprising:
receiving first information from a first base station at a mobile device and associated with a first channel;
receiving second information from a second base station at the mobile device and associated with a second channel;
determining a first channel quality of the first channel using channel estimation based on the first information;
determining a second channel quality of the second channel using channel estimation based on the second information;
allocating a first number of the predetermined number of channel information feedback bits to the first channel and a second number of the predetermined number of channel information feedback bits to the second channel, wherein the allocated first number is greater than the allocated second number when the first channel quality is greater than the second channel quality.

13. The method according to claim 12, further comprising:
determining size of a first channel state information codebook of the first channel according to the allocated first number, and generating the first channel state information codebook;
determining size of a second channel state information codebook of the second channel according to the allocated second number, and generating the second channel state information codebook;

determining a first feedback codeword in the first channel state information codebook according to channel state information of the first channel;

determining a second feedback codeword in the second channel state information codebook according to channel state information of the second channel;

sending the allocated first number and the allocated second number and sending an index number of the first feedback codeword and an index number of the second feedback codeword, wherein the index number is an identifier of the feedback codeword.

* * * * *